United States Patent
Zhang et al.

(10) Patent No.: US 6,741,575 B1
(45) Date of Patent: *May 25, 2004

(54) APPARATUS AND METHOD FOR EFFICIENT DELIVERY OF MULTICAST DATA OVER PERSONAL ACCESS COMMUNICATIONS SYSTEM (PACS)

(75) Inventors: Yongguang Zhang, Moorpark, CA (US); Bo Ryu, Moorpark, CA (US); Son K. Dao, Northridge, CA (US); Tayyab Khan, Montgomery Villa, MD (US); Stanley E. Kay, Rockville, MD (US); Sivakamar Kailas, Sunnyvale, CA (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,438

(22) Filed: Feb. 26, 1999

(51) Int. Cl.[7] .............................. H04L 12/56; H04J 3/24
(52) U.S. Cl. ...................... 370/329; 370/392; 370/401; 370/475
(58) Field of Search .......................... 370/310.1, 310.2, 370/312, 329–337, 338, 347, 349, 389, 395.1, 395.2, 390–432, 392, 401, 313, 475, 340, 341

(56) References Cited

U.S. PATENT DOCUMENTS 5,103,445 A * 4/1992 Ostlund ...................... 370/329
5,159,592 A 10/1992 Perkins ...................... 370/338

(List continued on next page.)

FOREIGN PATENT DOCUMENTS

| EP | 0 768806 A | 4/1997 |
|---|---|---|
| JP | 4-227149 | 8/1992 |
| JP | 8-279816 | 10/1996 |

(List continued on next page.)

OTHER PUBLICATIONS

Ryu, Bo, et al., "*Managing IP Services over a PACS Packet Network*" IEEE Network, Jul./Aug. 1998 pp. 4–10.

Almeroth, Kevin, et al. *Using Satellite Links as Delivery Paths in the Multicast Backbone (Mbone)* WOSBIS 98, pp. 47–54, Dallas, Texas Oct. 30, 1998.

(List continued on next page.)

*Primary Examiner*—Chi Pham
*Assistant Examiner*—Afsar M Qureshi
(74) *Attorney, Agent, or Firm*—V. D. Duraiswamy; M. W. Sales

(57) ABSTRACT

A method, apparatus, article of manufacture, and a memory structure for multicasting data in a cellular personal access communication system is disclosed. The method comprises the steps of allocating a multicast packet terminal identifier to a multicast group when a subscriber unit in a cell requests membership in the multicast group, receiving a multicast packet having a global multicast address, determining a cell identifier from a mapping of the global multicast address to at least one local multicast identifier and a cell identifier, and forwarding the multicast packet to the cell according to the cell identifier. The apparatus comprises a radio port controller unit having a packet data control unit coupled to a radio port configured to receive a multicast packet and a packet forwarding module. The packet data control unit includes an allocation module configured to allocate a local multicast identifier to a multicast group when a subscriber unit in a cell requests membership in the multicast group. The packet forwarding module is configured to determine a cell identifier from a mapping of the global multicast address to at least one local packet terminal identifier and a cell identifier and to forward the multicast packet to a cell according to the cell identifier.

34 Claims, 16 Drawing Sheets

U.S. PATENT DOCUMENTS

| | | | |
|---|---|---|---|
| 5,195,090 A | * 3/1993 | Bolliger et al. | 370/314 |
| 5,384,826 A | * 1/1995 | Amitay | 370/338 |
| 5,396,543 A | * 3/1995 | Beeson et al. | 370/328 |
| 5,426,643 A | 6/1995 | Smolinske et al. | |
| 5,519,691 A | 5/1996 | Darcie et al. | 370/335 |
| 5,586,121 A | 12/1996 | Moura et al. | |
| 5,590,133 A | * 12/1996 | Billstrom et al. | 370/332 |
| 5,612,959 A | 3/1997 | Takase et al. | 370/397 |
| 5,625,877 A | 4/1997 | Dunn et al. | 455/454 |
| 5,793,762 A | 8/1998 | Penners et al. | 370/389 |
| 5,812,951 A | 9/1998 | Ganesan et al. | |
| 5,875,178 A | 2/1999 | Rahuel et al. | 370/392 |
| 5,896,369 A | 4/1999 | Warsta et al. | 370/338 |
| 6,081,536 A | 6/2000 | Gorsuch et al. | |
| 6,331,984 B1 | 12/2001 | Luciani | 370/401 |
| 6,404,754 B1 | 6/2002 | Lim | 370/338 |
| 6,434,134 B1 | 8/2002 | LaPorta et al. | 370/338 |
| 6,452,915 B1 | 9/2002 | Jorgensen | 370/338 |
| 6,542,497 B1 | 4/2003 | Curry et al. | |

FOREIGN PATENT DOCUMENTS

| | | | | |
|---|---|---|---|---|
| JP | 9-505591 | 10/1997 | | |
| WO | WO 95/08900 | 3/1995 | | |
| WO | WO 95/16330 | 6/1995 | | |
| WO | WO 98 25422 A | 6/1998 | | H04Q/7/28 |
| WO | WO 98 27698 | 6/1998 | | H04L/12/64 |
| WO | WO 98/28938 | 7/1998 | | |

OTHER PUBLICATIONS

Eomds et al., A Combination Scheme of ARQ and FEC for Multimedia Wireless ATM Networks; ATM Traffic Control and Performance Evaluation, vol. E81–B, No. 5, May, 1998, pp. 1016–1024.

Zahedi, A. and Pahlavan, K.; Voice and Data Integration on TCP/IP Wireless Networks; IEEE International Symposium on Personal, Indoor and Mobile Radio Communications, vol. 2, No. 2; Sep. 1, 1997.

Bo Ryu, Jun Wei, Yongguang Zhang, and Son Dao, "Managing IP Services Over A Pacs Packet Network", vol. 12, No. 4, IEEE Jul./Aug. 1998.

Xylomenos, George, Polyzos, George C. "IP Multicasting For Wireless Mobile Hosts", Annual Military Communications Conference, U.S. New York, IEEE, vol. 15th, Oct. 22, 1996, pp. 933–937, XP000697406 ISBN: 0–7803–3683–6.

U.S. patent application Ser. No. 09/258,435, Ryu et al., filed Feb. 26, 1999.

Jun Murai et al., "building a Network by means of TCP/IP," 2nd Ed., vol. 1, Kyoritsu shuppan Kabushiki Kaisha (transliterated), Jun. 10, 1995, pp. 130–134 with English translation.

* cited by examiner

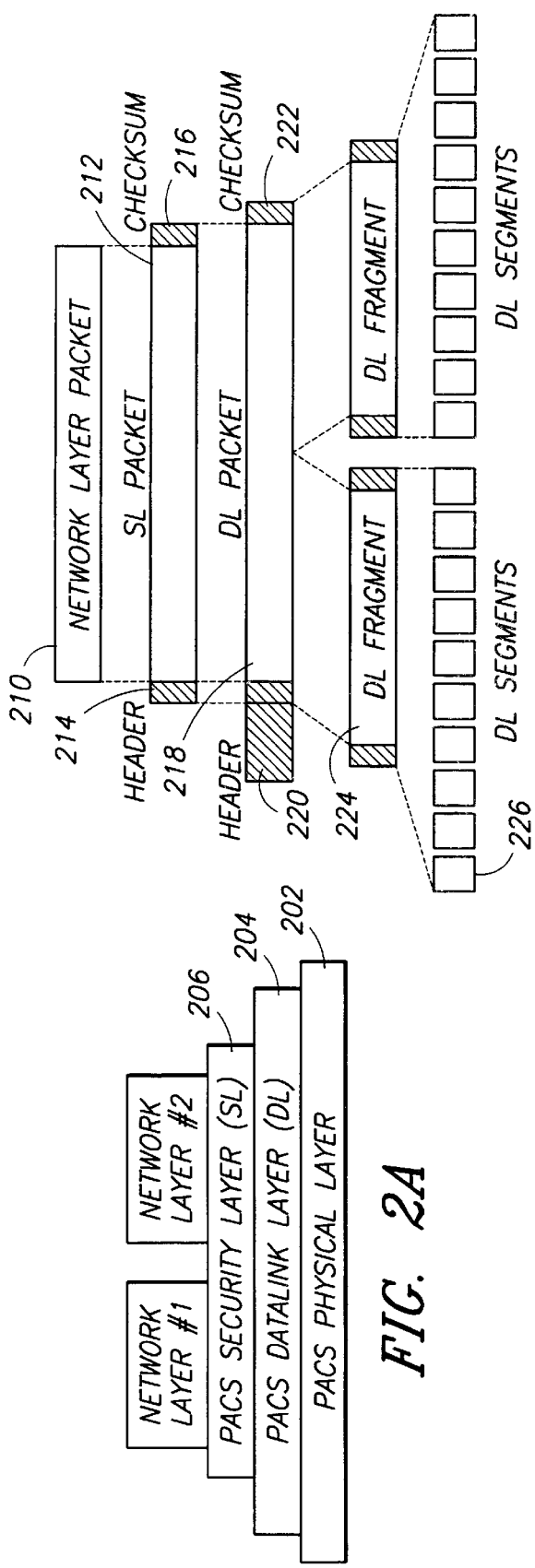
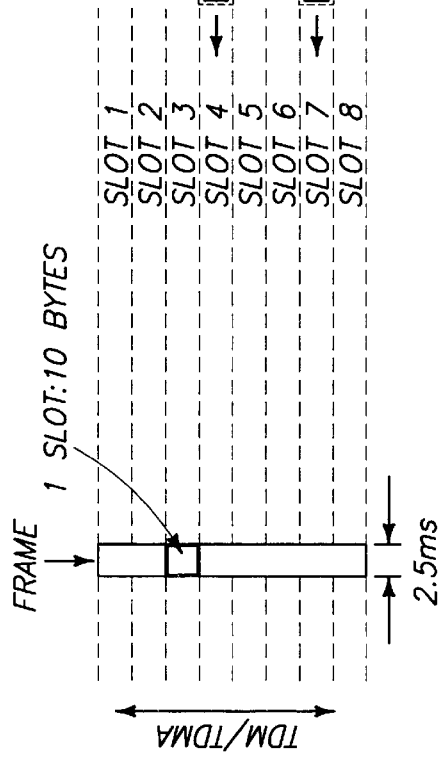
FIG. 2A
FIG. 2B
FIG. 2C

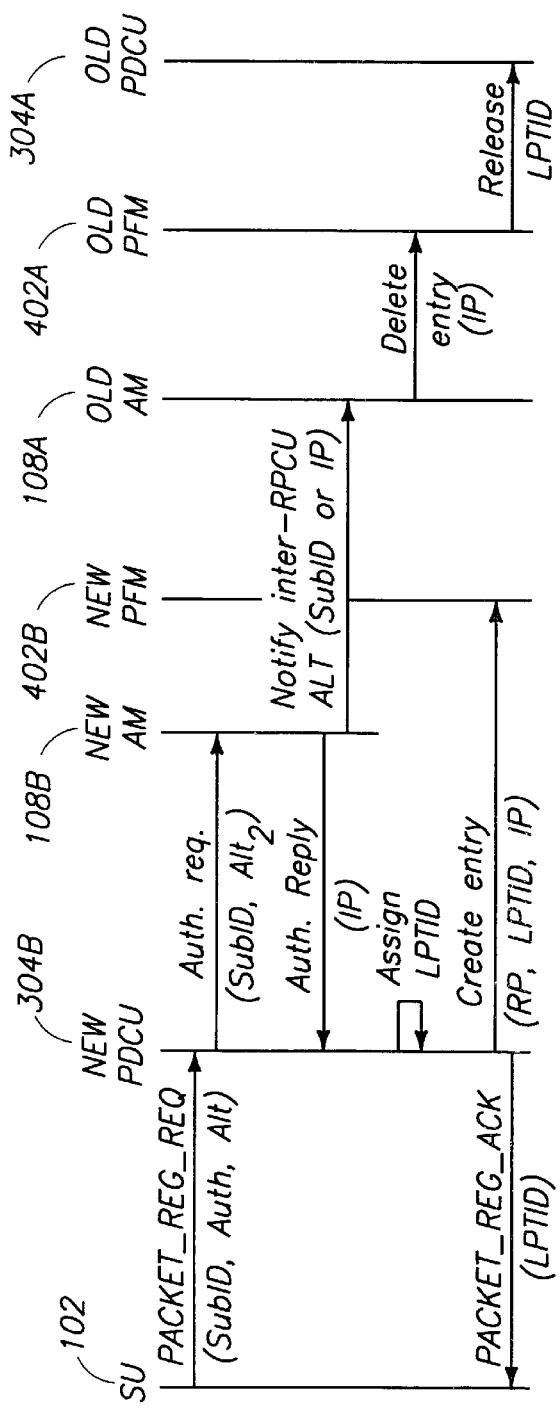
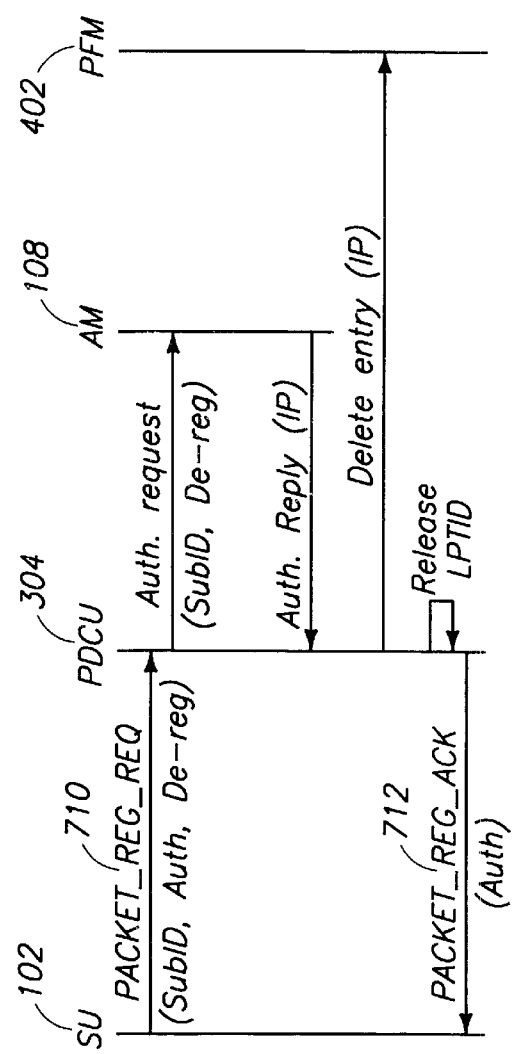
FIG. 7C
FIG. 7D

APPARATUS AND METHOD FOR EFFICIENT DELIVERY OF MULTICAST DATA OVER PERSONAL ACCESS COMMUNICATIONS SYSTEM (PACS)

CROSS-REFERENCE TO RELATED APPLICATIONS

This application is related to the following co-pending and commonly assigned patent application which is incorporated by reference herein:

application Ser. No. 09/258,435, entitled "INTERNET-AUGMENTED RADIO PORT CONTROLLER UNIT (RPCU) OF A PERSONAL ACCESS COMMUNICATIONS SYSTEM (PACS)," by Bo Ryu and Yongguang Zhang, filed on Feb 26, 1999, the same date as this application.

GOVERNMENT LICENSE RIGHTS STATEMENT

This invention was made with Government support under contract No. N66001-96-3-8901 awarded by the Naval Command, Control, and Ocean Surveillance Center. The Government has certain rights in this invention.

BACKGROUND OF THE INVENTION

1. Field of the Invention

The present invention relates to systems and methods of providing mobile cellular communications, and in particular, to a method and system for Internet services in a mobile cellular communications network.

2. Description of the Related Art

Traditionally, cellular mobile and wireless communication systems have been designed and built for voice service. With the explosive growth of Internet applications and users, there is an increasing demand on providing Internet service to mobile users based on the existing cellular systems. Voice communication is characterized as connection-oriented, circuit-switching, constant bit-rate, and low tolerance to loss and jitter. In contrast, Internet service is characterized by connectionless communication, packet-switching, bursty traffic patterns, multicast, differentiation of multiple classes of services, and often, best effort and loss-tolerant communication. In addition, some Internet applications desire much higher and often on-demand bandwidth such as videoconferencing using variable-bit-rate coding. Thus far, the development of a cost effective network architecture and necessary system components to meet these different requirements of Internet service on top of the existing infrastructure of voice-oriented cellular networks has remained an elusive goal.

FIG. 1 is a depiction of a PACS (Personal Access Communication System) 100. The PACS is an emerging low-tier, low-cost PCS standard for cellular wireless services in densely populated areas. The PACS standard defines two data communication modes (circuit-mode and packet-mode).

In a PACS network 100, users obtain services through subscriber unit (SU) devices 102. SUs 102 communicate with radio ports (RPs) through a time division multiple access (TDMA) uplink and time division multiplexing (TDM) downlink. The influence of the RPs 104, as determined by their transmission and reception range and that of the SUs 102, define cells 112.

Nearby RPs 104 are controlled by a radio port control unit (RPCU) 106, which concentrates all traffic from the RPs 104 and connects it to a backbone voice or data network. User authorization and other related functions are provided by an access manager (AM) 108 and a signaling network 110.

The PACS standard packet-mode data service serves as the fundamental building block for implementing and managing IP services in the Internet service architecture of the present invention.

The packet-mode data service of PACS, known as PACS Packet Channel (PPC), provides the user with a variable bandwidth, asynchronous, bandwidth-on-demand, and asymmetric data service at data rates up to 256 thousand bytes per second (Kbps). It is based on frequency-division-duplex, TDMA uplink and TDM downlink PACS physical interface which is common to both circuit-mode and packet-mode services. Uplink refers to the direction from SU 102 to RPCU 106, and downlink is from RPCU 106 to SU 102.

The high data rate and variable bandwidth nature of PPC is well suited to multimedia and the bursty nature of Internet traffic. PPC supports dynamic sharing of bandwidth with the PACS circuit mode services (voice, circuit-mode data, etc.), allowing PPC to utilize the bandwidth otherwise idle.

FIG. 2A is a diagram presenting a depiction of PPC layers. The PPC consists of three layers: a PACS physical layer 202, datalink layer (DL) 204 and security layer (SL) 206. The PACS physical layer performs coding of TDMA uplink and TDM downlink. Both uplink TDMA and downlink TDM frames are 2.5 msec long. Each frame consists of 8 slots and each slot is 10 bytes long. The task of the PPC DL layer 204 is to provide a reliable and connectionless communication service to the SL layer 206, which includes medium access control (MAC), fragmentation and segmentation, and error detection and correction. The major functions of SL layer 206 include handset registration, user authentication, and data encryption.

FIG. 2B illustrates the PACS standard encapsulation and framing procedure. First, the PPC copies each network layer packet 210 in an SL packet 212 with a header 214 and checksum 216 with optional payload encryption to prevent eavesdropping over the air. It then encapsulates each SL packet 212 in a DL packet 218 with proper header 220 and checksum 222. Each DL packet 218 is divided into one or more DL fragments 224 and finally each DL fragment 224 is subdivided into DL segments 226. Fragmentation is for the high-level medium access function—the PPC must assign a slot number (out from the 8 slots) for each DL fragment 224, and all segments of a fragment 224 must be transmitted in the same slot. Segmentation is to fit the TDM/TDMA airlink structure, which is depicted in FIG. 2C.

For downlink fragmentation, the maximum fragment size is 576 bytes of data. A larger packet must be fragmented but each fragment can be transmitted in different slots in parallel. Uplink fragments may be 256 segments long, therefore all uplink DL packets 218 are sent in a single fragment.

FIG. 2D and FIG. 2E are diagrams depicting the encapsulation uplink and downlink messages in greater detail.

FIG. 3 is a diagram of the functional architecture of the PPC. A contention function (CF) 302 performs the small subset of DL medium access and acknowledgment procedures that are highly time critical. A packet data controller unit (PDCU) 304 handles the rest of the DL and SL functions. The CF 302 resides in the RP 104, and PDCU 304 is typically implemented in the RPCU 304.

Each packet-mode SU 102 has a subscriber identity (SubID). The SubID is only used to authenticate a user during registration. In addition, each active SU 102 also has a transient identifier called LPTID (Local Packet Terminal Identifier). The LPTID is a one-byte integer specifying the source/destination SU 102 in every uplink/downlink slot over the wireless link. Each time an SU 102 enters a cell 112 (by cold-start or roaming), it is assigned a unique LPTID for as long as it remains in the cell 112. An LPTID is only valid in the current cell 112 and an SU 102 can have a different LPTID value in a different cell 112. LPTIDs are assigned by the PACS network 100 after successful registration and re-assigned after each hand-off. When the SU 102 moves to an adjacent cell, the old LPTID will not be used any more, and a new LPTID must be allocated in the new cell 112. The LPTID is thus transient in nature. Table I below shows the current allocation scheme for LPTID as defined in the standard.

TABLE 1

| LPTID Value | Purpose |
| --- | --- |
| 0 × 00 | Null |
| 0 × 01 | Registration message (used before the SU 102 is assigned an LPTID). |
| 0 × 02 - 0 × EF | Assigned to SUs 102 upon registration and handoff. This allows up to 238 SUs 102 in each cell 112. |
| 0 × F0 - 0 × FD | Reserved for future use |
| 0 × FE | System information (used to broadcast datalink layer, network layer, and "system information channel" parameters). |
| 0 × FF | All SUs 102. (Used for messages that must be broadcast to all SUs 102.) |

After successful registration, each active SU 102 is assigned a datalink layer address for use in the current cell 112. The datalink layer address is a one-byte integer called LPTID (Local Packet Terminal ID).

Whenever a SU 102 enters the network, it performs a PPC registration. Two major tasks of PPC registration are authentication and LPTID assignment. At the beginning of the registration, the SU 102 sends a registration request message (PACKET_REG_REQ) which includes its SubID (assuming no user anonymity). The AM 108 then authenticates the SU 102 using this SubID. Once the authentication is successful, the PDCU 304 assigns a new LPTID and sends the registration acknowledgment message (PACKET_REG_ACK) with this LPTID back to the SU 102. From then on, the SU 102 identifies data destined for it by the LPTID until it de-registers from the network or-moves-to a different cell 112.

A cell hand-off is known as an automatic link transfer (ALT). ALT takes place when SU 102 is crossing the wireless cell 112 boundary. It begins when an SU 102 detects the degradation of the present physical channel and finds another physical channel with sufficiently high quality. The SU 102 then sends an ALT request message to the new RP 102. Once the request is accepted, the SU 102 gets an ALT execution message back and a new LPTID for the new cell 112. Depending on whether the two channels are associated with the same RPCU 106 or not, ALT can be divided into two categories: intra-RPCU ALT when SU 102 moves to an adjacent cell in the same RPCU 106, and inter-RPCU ALT when SU 102 moves to a different RPCU 106.

Thus far, PACS 100 has been developed primarily as a voice network. Although the standard does define two data communication modes (circuit-mode and packet-mode), Internet service support in a PACS network 100 has not been addressed. Internet access could be provided through the circuit-mode data service, where users establish a point-to-point protocol (PPP) connection to an Internet Service provider (ISP) over a dedicated PACS channel. But, because of the fixed bandwidth, this type of access is unscalable and inefficient for Internet applications.

What is needed is a network architecture and a set of design guidelines for achieving seamless integration of cellular networks with the global Internet by supporting mobile and multicast IP services in cellular networks. The present invention satisfies that need.

SUMMARY OF THE INVENTION

To address the needs and requirements outline above, the present invention discloses new system and network architecture for a PACS network. It augments the PACS voice network with IP routers and backbone links to connect to the Internet or an Intranet. Further, a Mobile-IP has been incorporated into the hand-off mechanism in order to support roaming within a PACS network as well as global mobility between PACS networks and rest of the Internet/Intranet. The present invention also discloses the use of native PACS multicast and group management schemes to support dynamic IP multicast and multicast backbone (MBone) connectivity.

These features seamlessly integrate existing PACS networks into the global Internet and provide a standard-conforming IP service with global mobility support. The system allows a PACS user to gain wireless Internet access using a prototype packet-mode SU connected to a mobile personal computer (PC). Most IP applications can run as if the mobile personal computer were a fixed Internet host.

The user and the mobile PC can roam within the PACS wireless network or move between PACS networks and the outside Internet using Mobile IP. IP multicast and MBone applications are also seamlessly and efficiently supported using the native PACS multicast.

The present invention also discloses a method and apparatus to extend the functionality of a device called a packet forwarding module implemented in the RPCU and its related elements to achieve efficient one-to many (multicast) communications among PACS users within a PACS wireless network. A system design and architecture for an SU to support multicast is also disclosed. The mechanisms added to the packet forwarding module and the SU provide (1) dynamic mapping between a global multicast address and local PACS group addresses, (2) selective multicast to forward multicast packets only to cell(s) that have at least one group member, and (3) efficient group membership management.

The multicast extension provides several advantages over current systems. First, it delivers only a single copy of a multicast packet to PACS group members. Second, no multicast packet is transmitted to cells that do not have group member, thus saving airtime. Because the implementation of PACS multicast delivers exactly one copy of data per cell to only those PACS users who are members of the group, the usage of PACS bandwidth is optimal, and the power consumption of PACS users who are not members of the group is not wasted (since they do not process multicast data). Third, any network layer multicast scheme (such as IP multicast and CDPD multicast) can be seamlessly supported. Finally, the extension efficiently and accurately maintains group membership.

The present invention also discloses a method and apparatus for multicasting data. The method comprises the steps of allocating a multicast packet terminal identifier to a multicast group when a subscriber unit in a cell requests membership in the multicast group, receiving a multicast packet having a global multicast address, determining a cell identifier from a mapping of the global multicast address to at least one multicast local packet terminal identifier and a cell identifier, and forwarding the multicast packet to the cell according to the cell identifier.

The apparatus comprises a radio port controller unit having a packet data control unit coupled to a radio port configured to receive a multicast packet and a packet forwarding module. The packet data control unit includes an allocation module configured to allocate a multicast local packet terminal identifier to a multicast group when a subscriber unit in a cell requests membership in the multicast group. The packet forwarding module is configured to determine a cell identifier from a mapping of a global multicast address for the multicast packet to at least one multicast local packet terminal identifier and a cell identifier. The packet forwarding module also forwards the multicast packet to a cell according to the cell identifier.

The present invention results in (1) a PACS system architecture that provides wireless Internet and Intranet access by augmenting the voice network with IP routers and backbone links to connect to the Internet; (2) a simplified RPCU design for easy service maintenance and migration to future IP standards such as IPv6; (3) the use of a native PACS multicast to efficiently support dynamic IP multicast and multicast backbone (MBone) connectivity; and (4) optimization and incorporation of Mobile IP into PACS hand-off mechanism to efficiently support roaming within a PACS network as well as global mobility between PACS networks and the Internet.

BRIEF DESCRIPTION OF THE DRAWINGS

Referring now to the drawings in which like reference numbers represent corresponding parts throughout:

FIG. 2A is a diagram presenting a depiction of PACS packet channel layers; and

FIG. 2B is a diagram illustrating PACS standard encapsulation and framing;

FIG. 2C is a diagram of the TDM/TDMA airlink structure of the PACS;

FIGS. 7A–7D are diagrams showing the registration, intra-RPCU handoff, inter-RPCU handoff, and deregistration;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

PACS Internet Service Architecture

Figure 1:
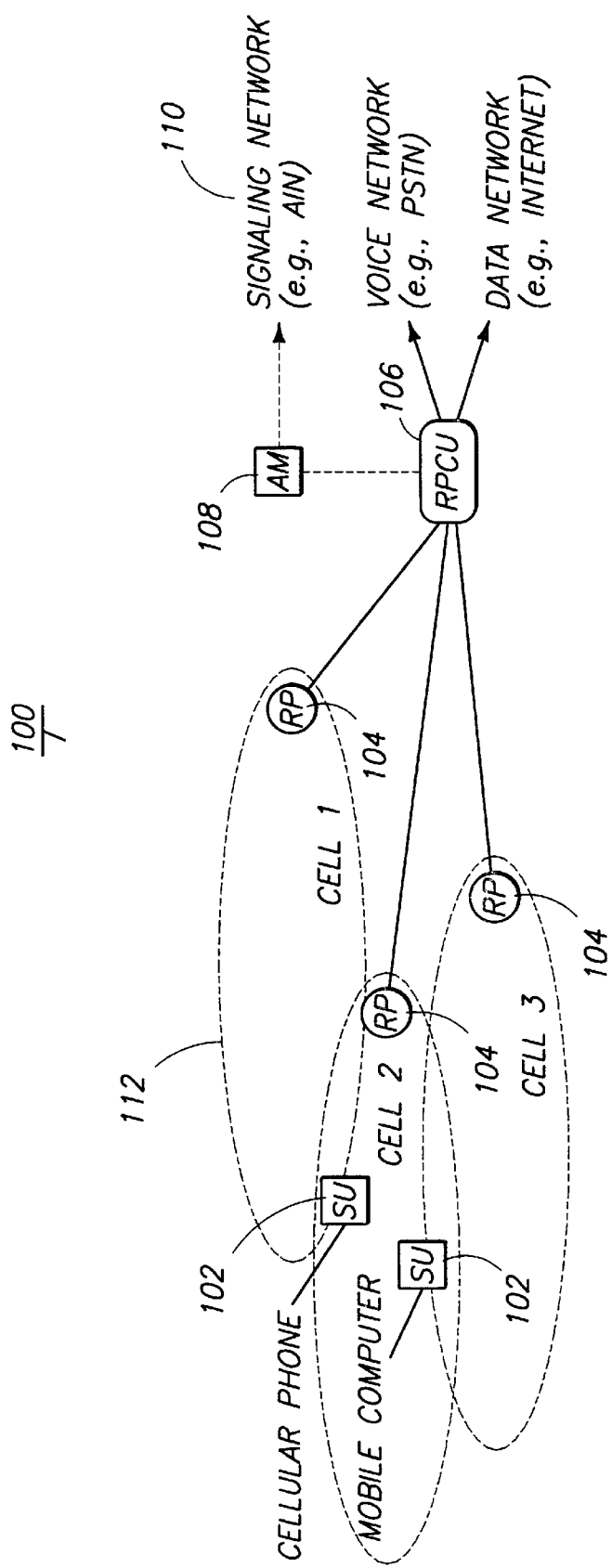
FIG. 1 is a depiction of a Personal Access Communication System (PACS)
Figure 2D:
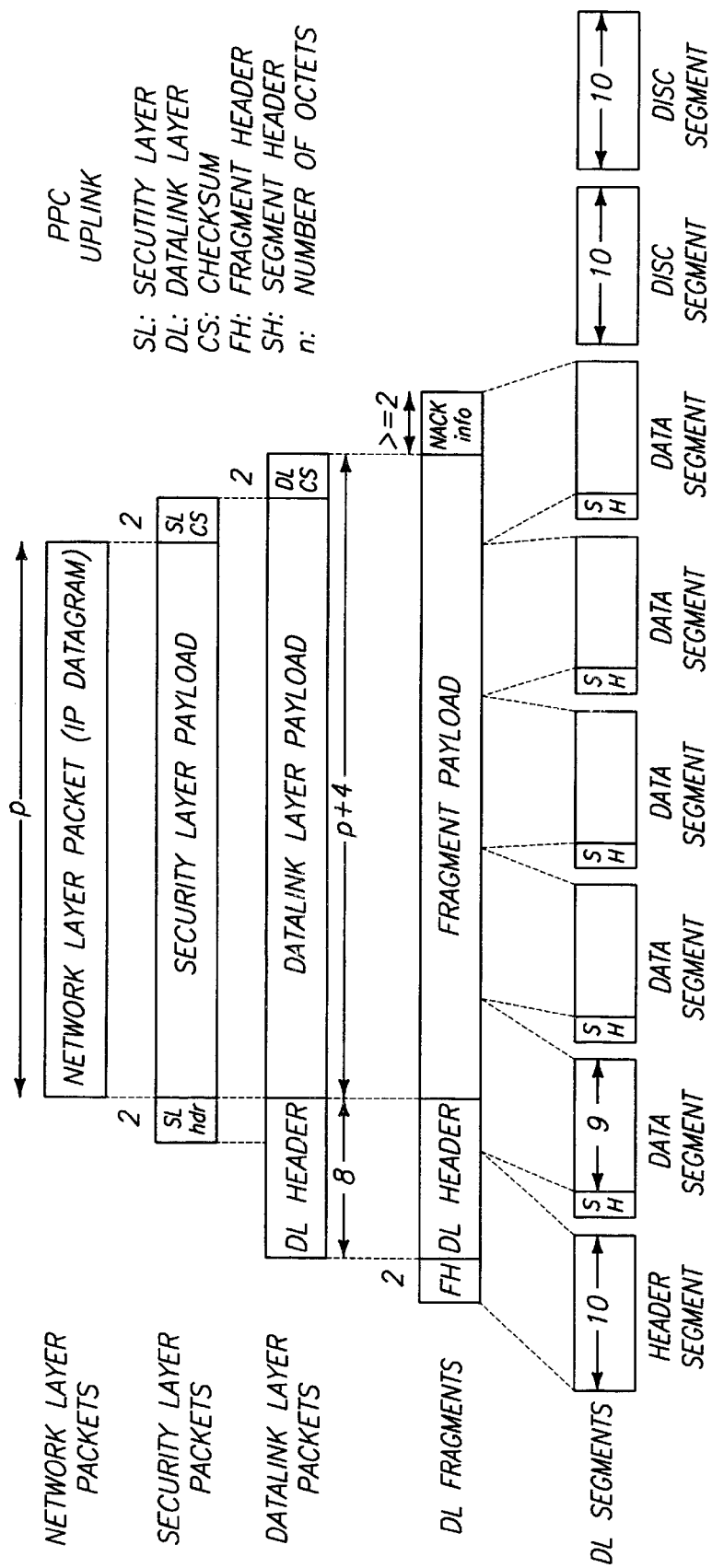
FIGS. 2D and 2E are diagrams depicting the encapsulated uplink and downlink messages in greater detail.
Figure 2E:
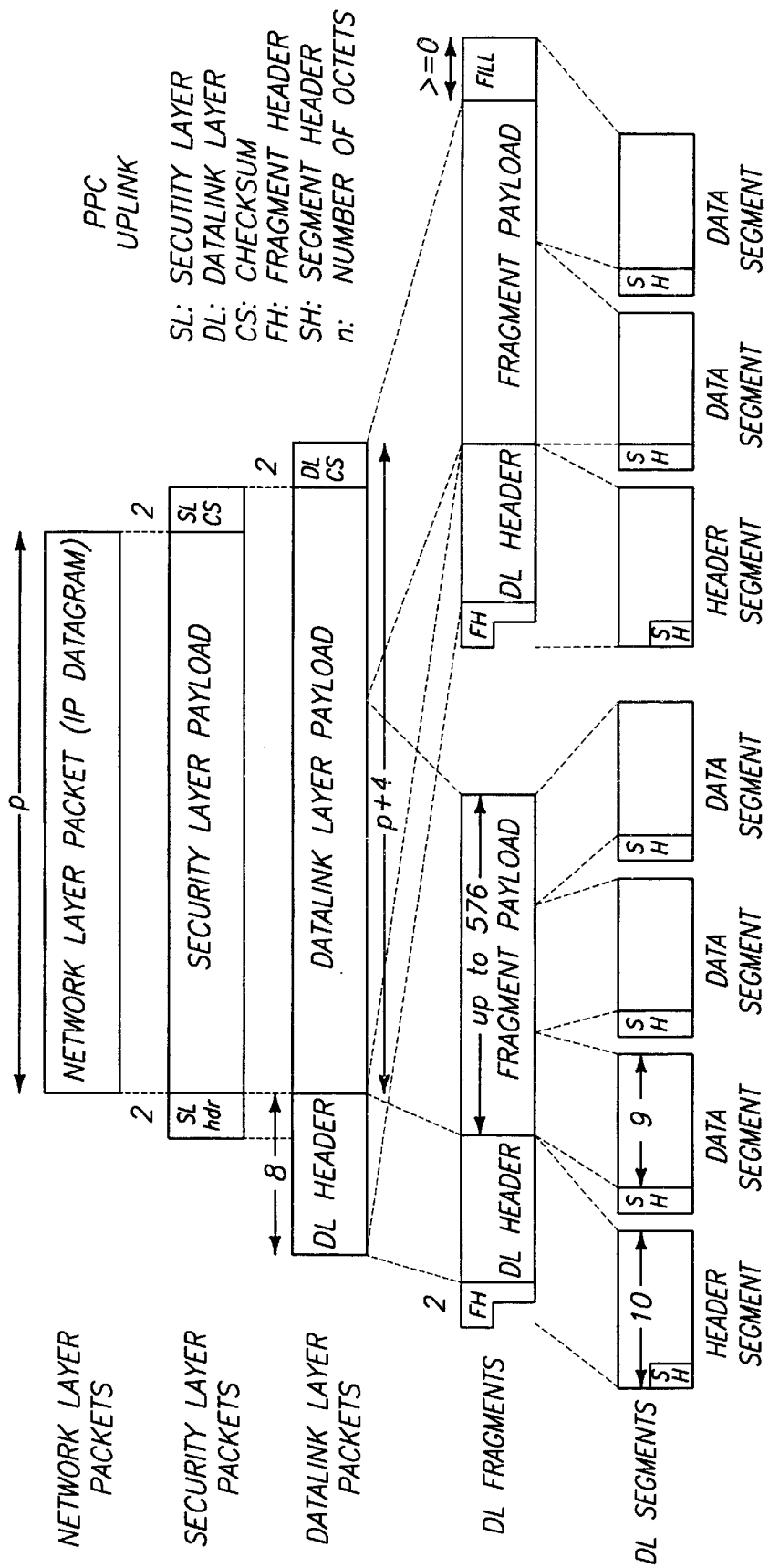
Figure 3:
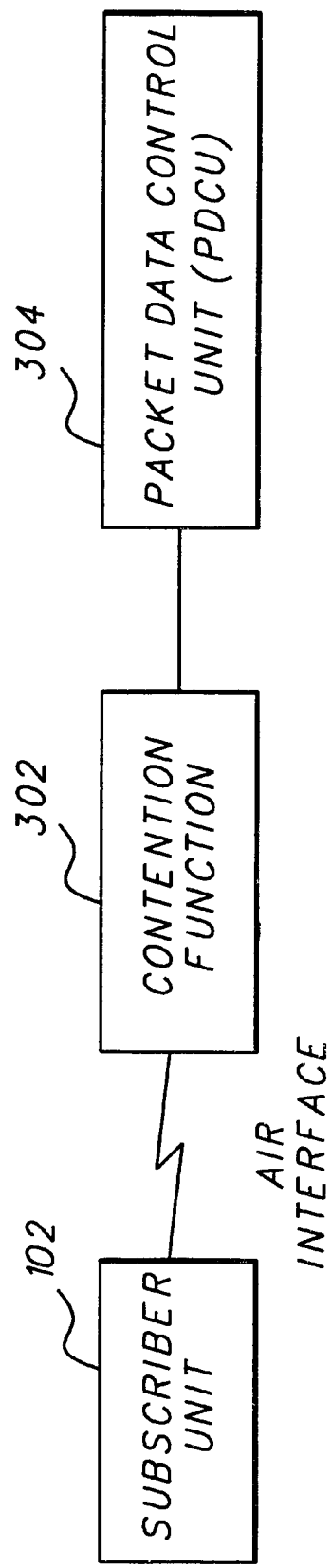
FIG. 3 is a diagram of the functional architecture of the PPC.
Figure 4:
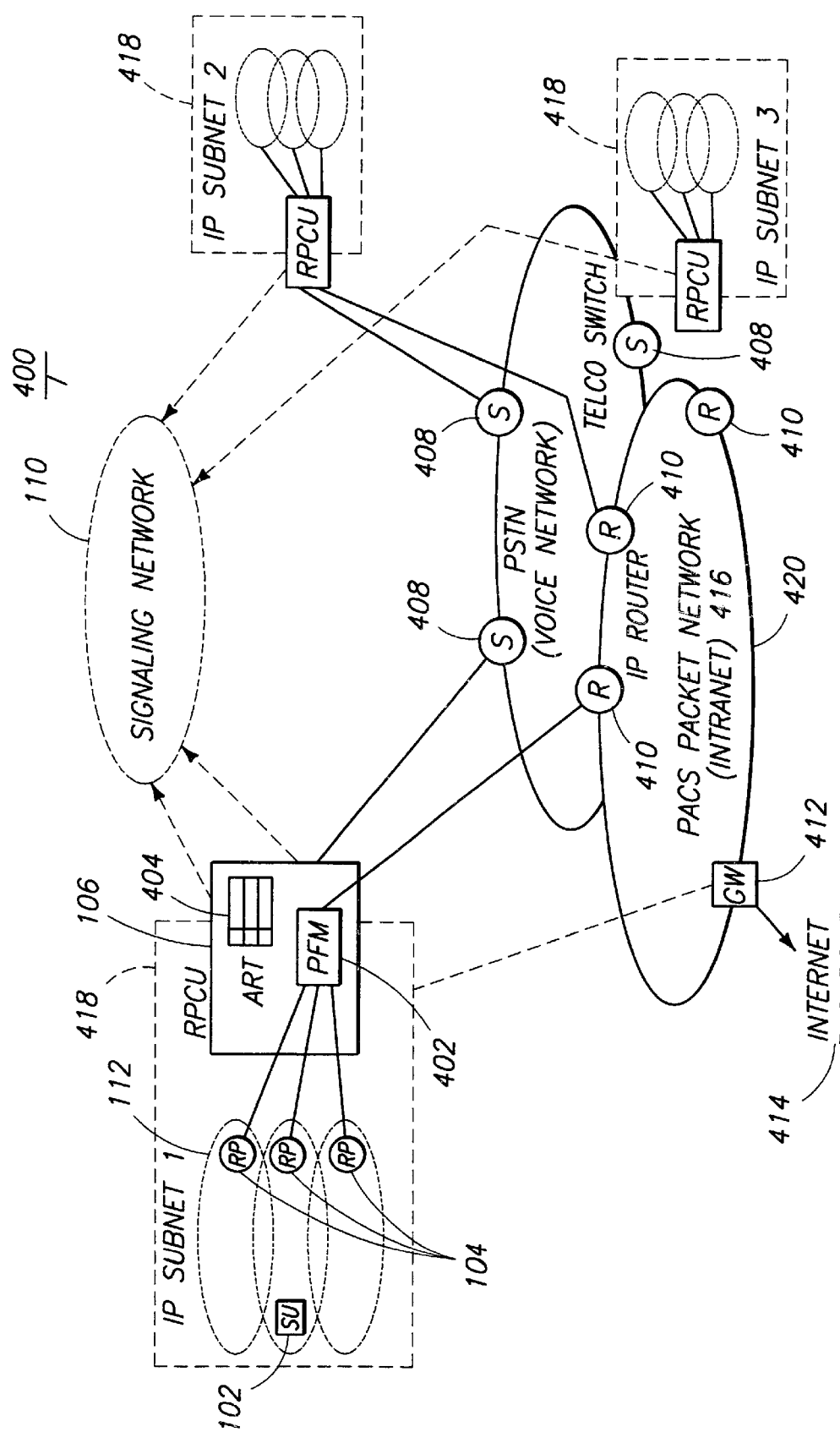
FIG. 4 is a diagram of the PACS Internet services architecture (PISA)

FIG. 4 is a diagram showing the PACS Internet services architecture (PISA). The PACS Internet services architecture 400 includes the existing PACS voice network 100 augmented with a new data network called PPN (PACS Packet Network) 416. The subnet 418 is the basis sub-network unit to provide wireless packet data to SUs 102. An IP subnet 418 comprises one or more cells 112, a base station or RP 104 per cell 112, and an RPCU 106 which connects all of the cells to a wireless backbone interconnected network. The RPCU 106 also acts as a network gateway and multicast server for the subnet 418.

Each RPCU 106 is in communication with an Internet protocol (IP) router 410. PPN 416 is an internetwork connecting all IP subnets 418 by the IP routers 410 and backbone links 420. Border gateways (GW) 412 connect different PPNs 416 (from different PACS network operators) and the global Internet 414. Each GW 412 also includes firewall and other security functions to protect PACS network premises and PACS users. In the PISA 400, a mobile personal computer (PC) with the packet-mode SU 102 constitutes a legitimate host in the Internet/Intranet with a unique IP address. The SUs 102 are network devices that provide the mobile host with a wireless network interface to the Internet through the PACS network. The PPN 416 becomes a large IP network.

When a user subscribes to PACS IP service from a network operator, the SU 102 is assigned a permanent IP address from a "home" network. When the user connects a personal computer to the SU 102, the PC will use this IP address as its host address in accessing the Internet. In this context, the home network is an IP subnet 418 serviced by an RPCU 106 that the user is likely to use the most. The network operator records the permanent IP address in its database that can be retrieved later by AMs 108. For each SU-addressed IP datagram sent to this IP address, the PPN 416 is responsible for forwarding the packet to the "home" subnet 418. The corresponding RPCU 106 then delivers it to the target SU 102 when the user is currently within the home IP subnet 418. Outgoing IP datagrams from the SU 102 (SU-sourced) are forwarded by RPCU 106 to an IP router. The unicast routing in PPN 416 ensures its correct delivery across the PPN 416 and the Internet. Handling of cases where a SU 102 moves outside the home IP subnet 418 is discussed later in this disclosure.

From point of view of the IP network, the RPCU 106 and its RPs 104 behave like an intelligent link-layer router/bridge between the IP router 410 and all the mobile IP hosts (SUs 102). This architecture hides the PACS-specific details from the IP router 410 so that it can use any "commercial-off-the-shelf" (COTS) product. The connection between RPCU 106 and the IP router 410 can be any type of data network, such as Ethernet or Frame Relay. Since many routers support multiple IP subnets 418, it is feasible to have one IP router 410 connect many RPCUs 106, one RPCU 106 per router-port.

This network architecture is significant different than a traditional telecommunication network. While it is commonly assumed that autonomous transfer mode (ATM) communications will be the backbone of 3rd generation wireless telecommunication network, an IP network makes a better choice. ATM has been shown to be inefficient in supporting transmission control protocol/Internet protocol (TCP/IP) applications and the extra layer may not be necessary. IP-based intranet costs less to install and to manage. Further, mobile management would have to been done in both IP and ATM layers. While ATM mobility is under research, Mobile-IP has been standardized by the Internet community and is supported in a number of commercial products. The multicast mechanism in Mobile-IP is also superior.

The main function of RPCU 106 in the PISA 400 is to deliver IP datagrams to and from SUs 102. The RPCUs 106 serve the basic network-layer to datalink-layer interface functions: address resolution, framing, and medium access.

Figure 5A:
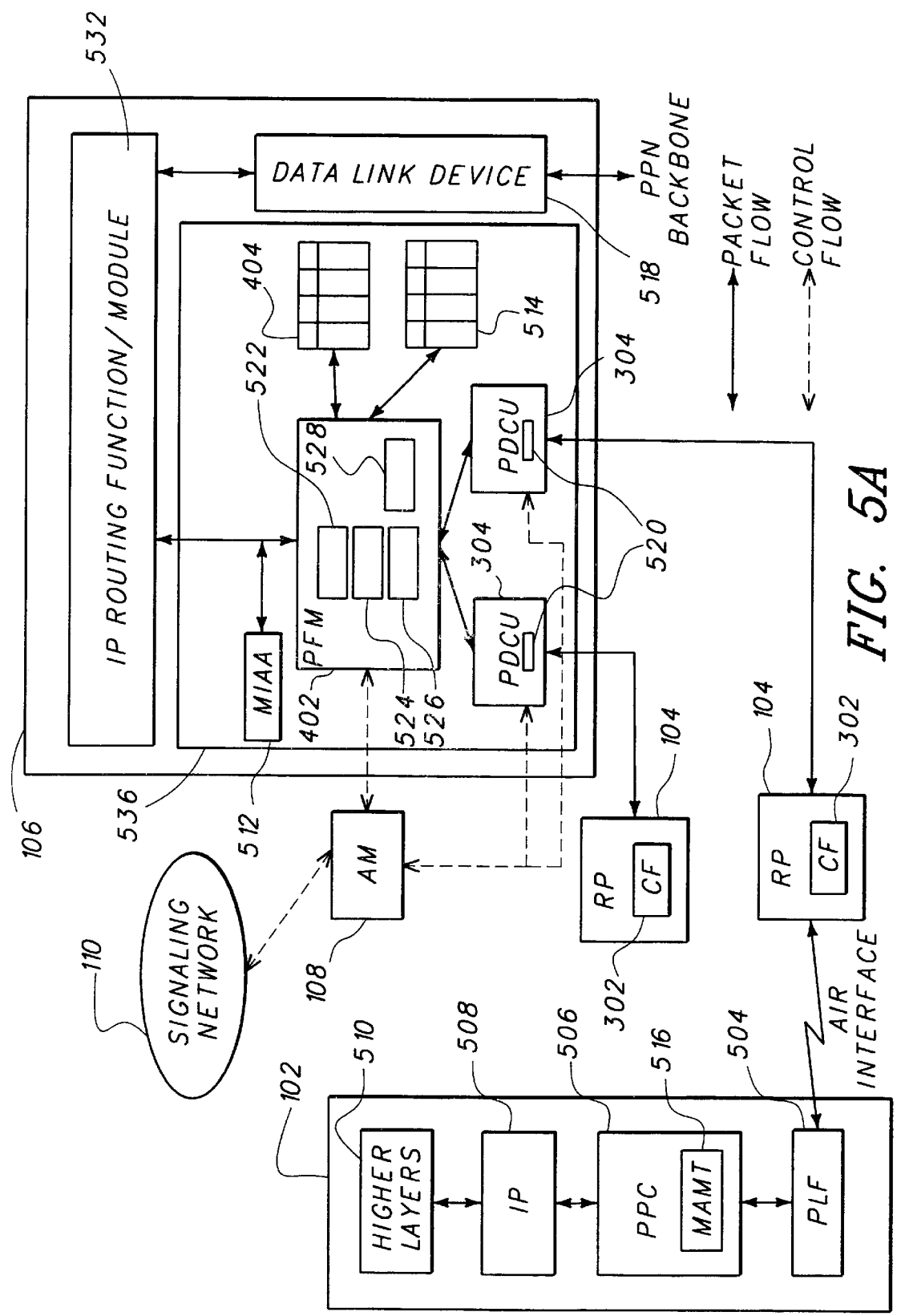
FIG. 5A is a block diagram of one embodiment of the radio port controller unit (RPCU)

FIG. 5 is a block diagram of one embodiment of the RPCU 106 and related system elements. A key component of RPCU is the Packet Forwarding Module (PFM) 402, which implements network-layer to datalink-layer address translation. A network layer module such as IP router routing function module 532 handles routing between PACS users and the backbone network.

The PISA 400 uses the LPTID as the datalink layer address. To deliver SU-addressed data such as an IP datagram in a downlink direction, the PFM 402 coordinates with one or more packet data control units PDCUs 304 to manage the LPTIDs. This is because the PFM 402 must know which cell 112 (and related RP 104) has the SU's 102 receiver and what LPTID to use. Hence, the PFM 402 maintains a mapping between the IP address and the tuple (RP identifier, LPTID) for each SU 102. In one embodiment, this mapping is stored as a table is called a (unicast) address resolution table (ART) 404 (the multicast case is discussed later in this disclosure). The ART 404 is updated during user registration, SILT, and de-registration. Once the entry is found, PFM 402 passes the RP identifier and LPTID information along with the IP datagram to the corresponding PDCU 304 associated with the RP 104 servicing the cell 112 where the SU 102 is disposed.

IP forwarding of SU-sourced data in the uplink direction (SU 102 to RPCU 106) is implemented as follows. The PDCU 304 receives segments from the RP 104 servicing the cell 112 in which the SU 102 is disposed, and assembles the datalink payload. When the PDCU 304 receives a complete IP datagram, it passes the datagram to the PFM 402. The PFM 402 checks whether the datagram is targeted for another SU 102 in the same subnet 418. If the datagram is targeted for another SU 102 in the same subnet 418, the PFM 402 forwards the message using the same procedure as described above. If not, the PFM 402 forwards the IP datagram to the routing module 532 for dissemination via a data link device 518 to the PPN backbone.

The IP routing module 532 in the RPCU 106 transmits and receives messages to and from an Internet host via a data link device 518 for the PPN network 416. The IP routing module 532 may interface with different types of data link devices 518, selecting the appropriate data link device 518 based upon the link technology used in the PPN backbone. The IP routing module 532 communicates the messages received through the data link device 518 to the PACS device 536 via an IP router port 534.

Figure 5B:
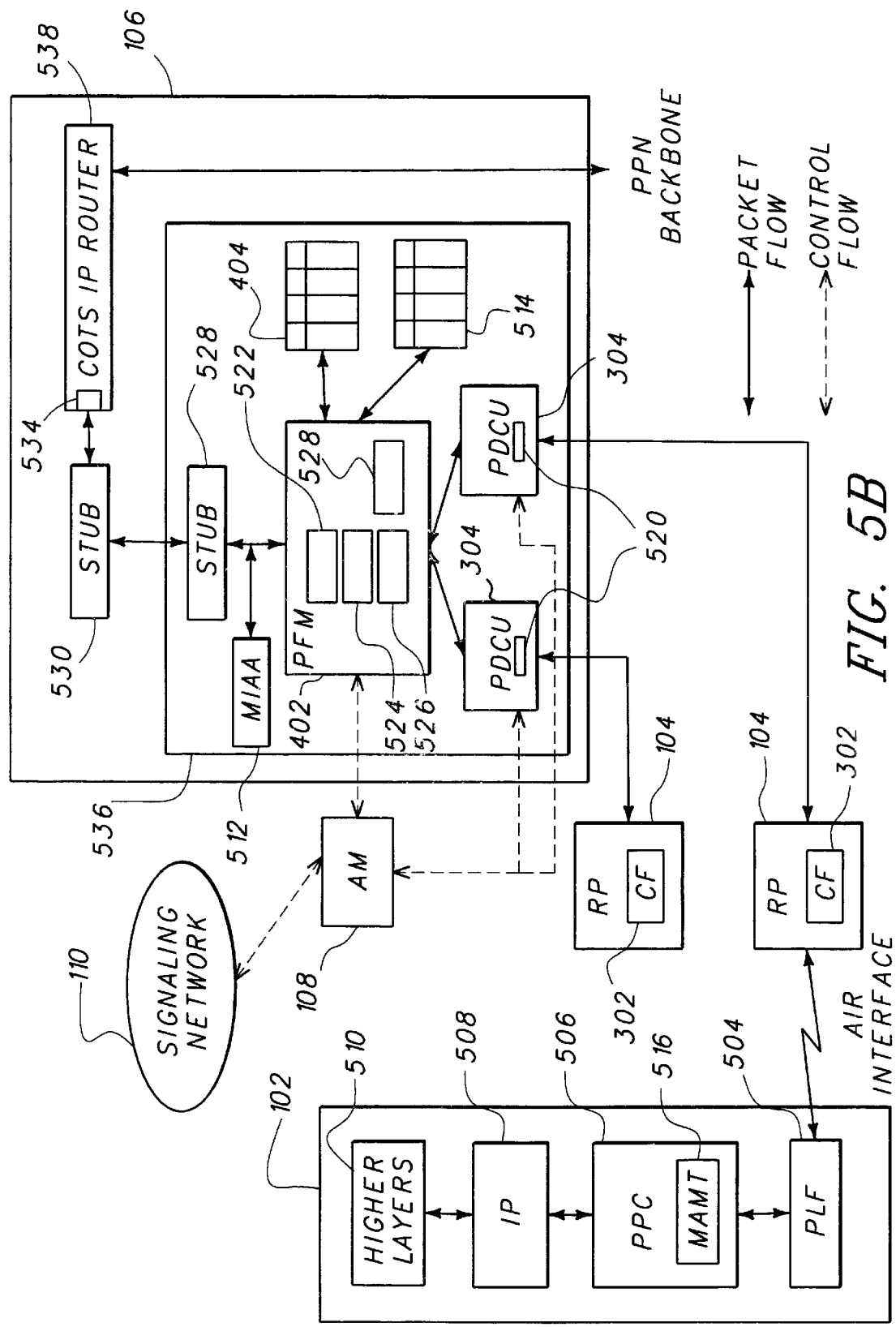
FIG. 5B is a block diagram of another embodiment of the RPCU using a commercial off the shelf IP router.

FIG. 5B is a block diagram illustrating another embodiment of the RPCU 106. In this embodiment, the RPCU 106 uses a modular approach which includes two physically distinct hardware units: a commercially-available, off the shelf (COTS) IP router 538, and a PACS device 536.

Many COTS IP routers 538 support multiple connections of different data transfer protocols (e.g. Ethernet or frame-relay), and the data made available to the PACS device 536 via the IP router port 534 may conform to any one of these protocols. At the same time, the PACS device 536 generally will not conform to any common data transfer protocol. Hence, stubs 530 are provided between the IP router port 534 and the packet forwarding module 402. These stubs 534 perform the necessary translation to convert messages from the data transfer protocol offered at the IP router port 534 and the protocol required by the PACS device 536. The stub 534 may be implemented by common local area network device (LAN). Further, the stub 534 may comprise two stub elements, including one in the PACS device 536. In either case, the stub 534 LAN device forwards data packets to and from the packet forwarding module 402 and performs any protocol and/or language translation that is required.

One advantage of this modular approach is that changes to one device do not affect the other, allowing an easy and rapid upgrade path. For example, improvement of Mobile IP protocols affect only the COTS IP router 538, while changes to the PACS device 536 do not impact the COTS IP router 538. As a result, new services and functions can be more easily created. The use of the COTS IP router 538 also obviates the need for the data link device 518.

In addition to the security layer, the SU 102 comprises a PPC module 506, which serves the same basic network-layer to datalink-layer interface functions as the PDCU 304 and the CF 302, including framing and medium access. Address resolution, however, is unnecessary because the communication with any other host is always through RPCU 106.

The SU 102 also comprises a PACS physical layer function (PLF) 504, which receives and transmits the data packages with the RP 104, a PACS packet channel (PPC) 506 which assembles the received data packages into messages, an Internet protocol module 508 which translates messages in the Internet protocol.

Figure 6A:
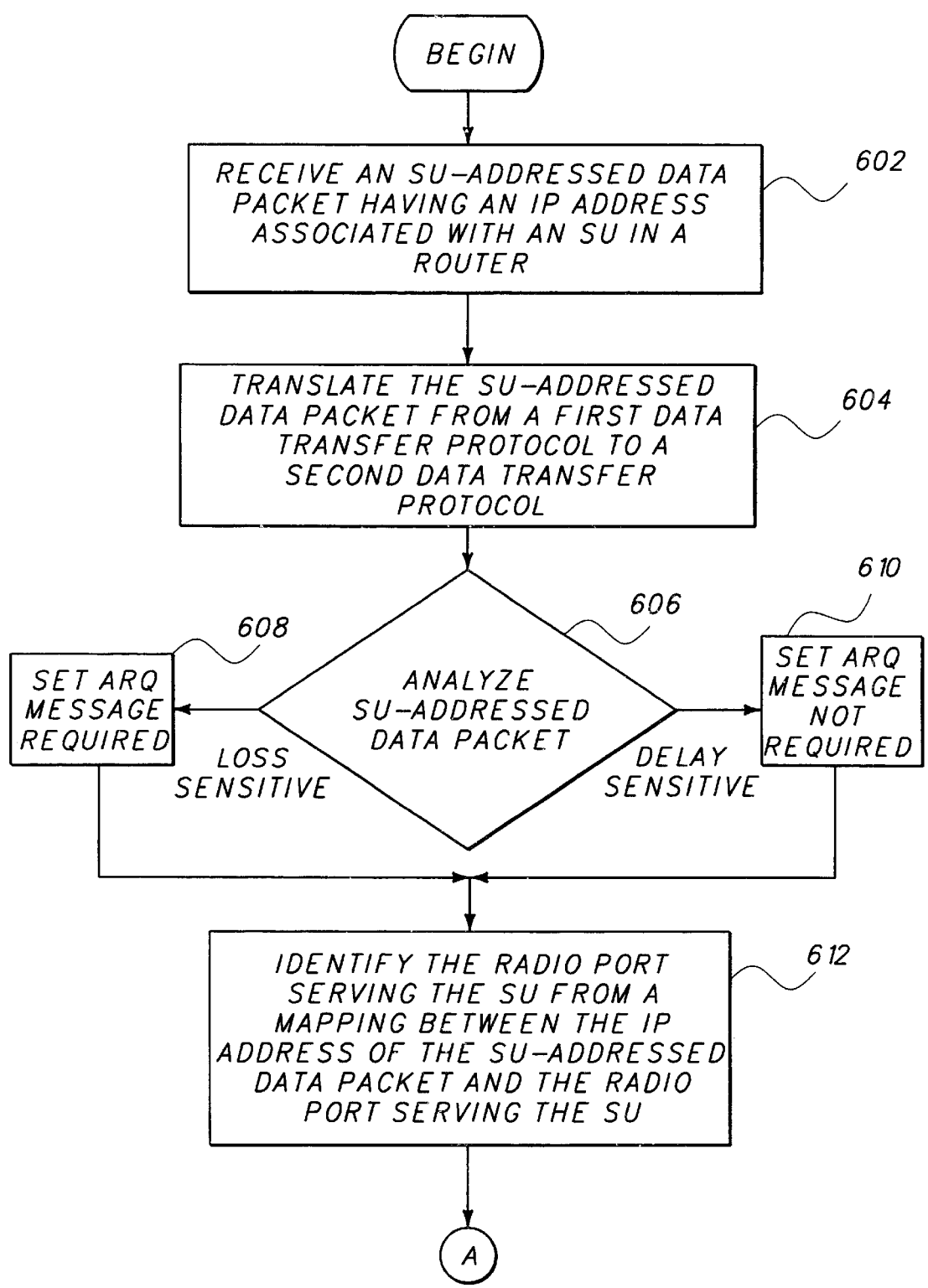
FIGS. 6A and 6B are flow charts illustrating exemplary operations used in practicing the present invention.
Figure 6B:
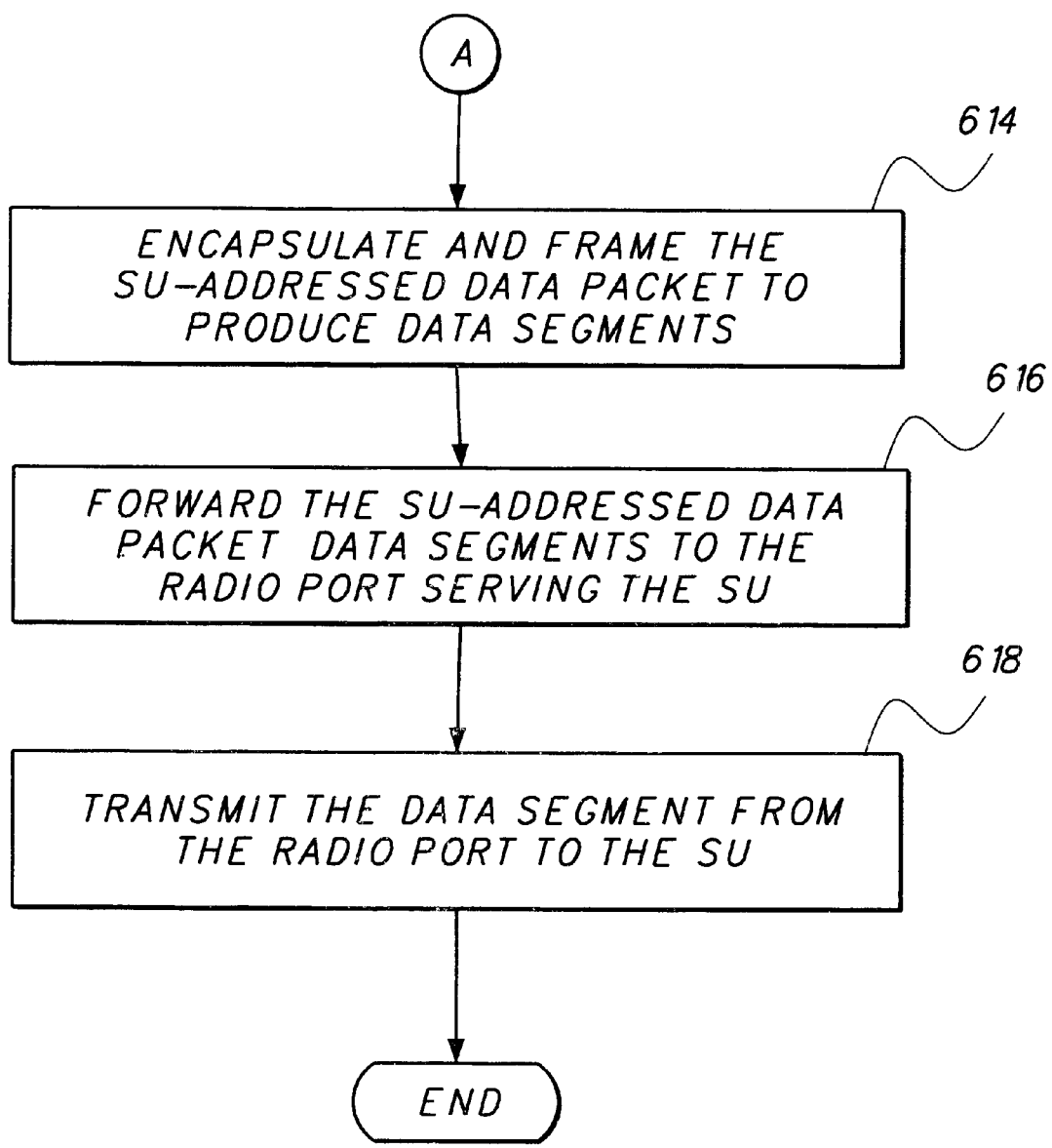

FIG. 6A and 6B are flow charts illustrating the above operations. First, a SU-addressed data packet having an IP address associated with an SU 102 is received, as shown in block 602. Then, the SU-addressed data packet is translated from the router 532 protocol presented at the router port 534 to a protocol used by the PFM 402, as shown in block 604. Then, the SU-addressed data packet is analyzed 606 to determine whether an ARQ message is required. If the message is loss-sensitive, an ARQ message is required, and if the message is delay-sensitive, an ARQ message is not required. Next, the RP 104 serving the SU 102 is identified from the mapping between the IP address of the SU-addressed data packet and the RP 104 serving the SU, which mapping is stored in the ART 404. Then, the PDCU 304 encapsulates and frames the SU-addressed data packet to produce data segments 226, as shown in block 614. These data segments 226 are then forwarded to the RPs 104 serving the SU 102, where they are transmitted to the SU 102 as shown in blocks 616 and 618.

FIGS. 7A–7D are diagrams showing the registration, intra RPCU 106 handoff, inter RPCU 106 handoff, and deregistration.

Whenever an SU 102 enters the PISA 400, it performs a packet data service registration. It does so by sending a registration message to the RPCU 106 right after it obtains a physical channel. The registration message contains SU's 102 permanent identifier SubID. The RPCU 106 then passes it to AM 108 for user authentication and authorization. At the end of the registration, the AM 108 retrieves the SU's 102 permanent IP address recorded during service commission and return it to the PFM 402. Afterwards PDCU 304 will assign an LPTID from the RP 104, and PFM 402 then enters the IP address to the RP identifier and LPTID mapping in the ART 404.

Figure 7A:
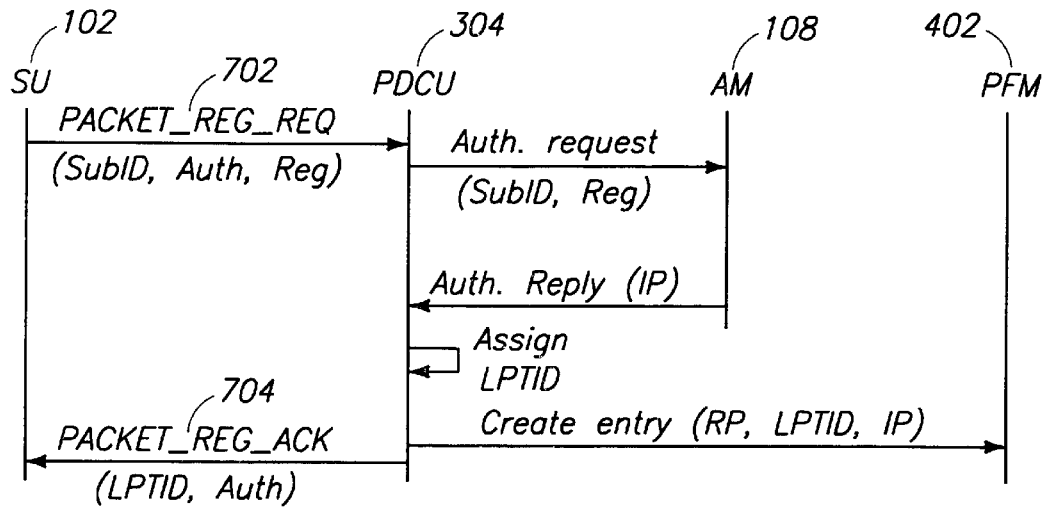

FIG. 7A is a diagram showing SU 102 registration. Whenever a SU 102 enters the network 100, it performs a PPC registration. It does so by sending a registration message to the RPCU right after it obtains a physical channel. Two major tasks of PPC registration are authentication, authorization, and LPTID assignment.

At the beginning of the registration, the SU 102 sends a registration request message (PACKET_REG_REQ) 702 which includes its SubID (assuming no user anonymity) to the PDCU 304 in the RPCU 106, which forwards the SubID to the AM 108. The AM 108 then authenticates the SU 102 using the SubID. Once the authentication is successful, the AM 108 retrieves the SU's 102 permanent IP address recorded during service commission, and returns it to the PDCU 304. The PDCU 304 assigns a new LPTID and sends a registration acknowledgment message (PACKET_REG_ACK) 704 with this LPTID back to the SU 102. From then on, the SU 102 identifies data destined for it by the LPTID until it de-registers from the network 100 or moves to a different cell 112.

Handoff and Mobility Management

Figure 7B:
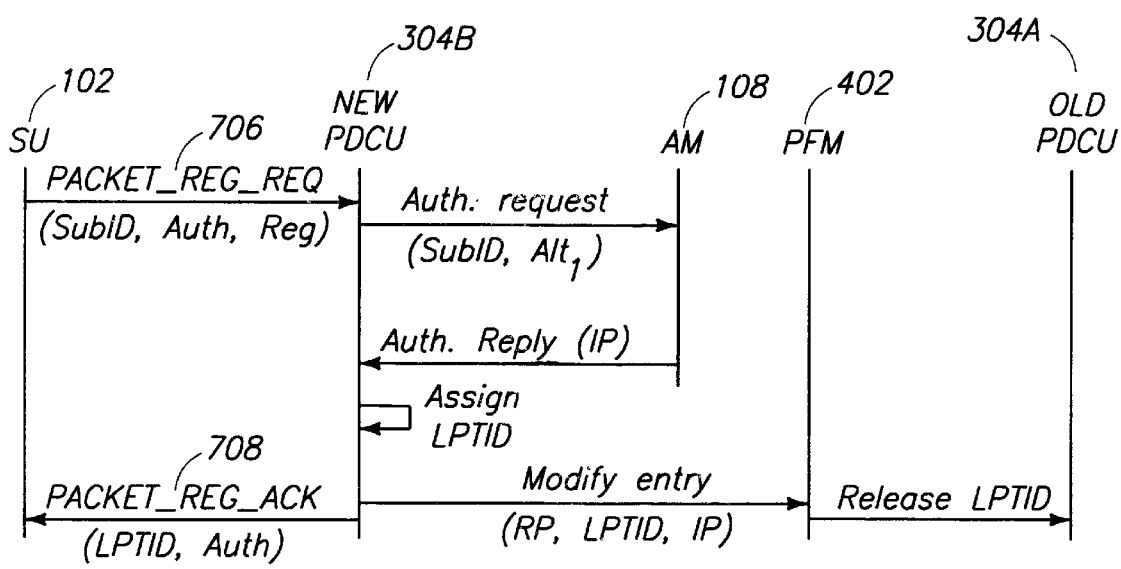

FIGS. 7B–7C are diagrams showing SU 102 hand-off. In a PACS system 100, a hand-off is referred to as an automatic link transfer (ALT). An ALT takes place when SU 102 crosses the wireless cell 112 boundary. An ALT begins when an SU 102 detects the degradation of the-present physical channel and finds another physical channel with sufficiently high quality. The SU 102 then sends an ALT request message 406 to the new RP 104 associated with a new PDCU 304B (the PDCU 304 associated with the new cell 112).

Once the request is accepted, the new PDCU 304 assigns a new LPTID, and the SU 102 gets an ALT execution message 408 back and a new LPTID for the new cell 112.

Depending on whether the two channels are associated with the same RPCU 106 or not, ALT can be divided into two categories: intra-RPCU ALT depicted in FIG. 7B when SU 102 moves to an adjacent cell 112 in the same RPCU 106, and inter-RPCU ALT depicted in FIG. 6D when SU 102 moves to a different RPCU 106. The new PDCU 304 determines whether it is intra-RPCU or inter-RPCU by examining the complete port ID (old RP) field in the PACKET_REG_REQ which contains the RP 104 and RPCU 106 addresses.

In the intra-RPCU case shown in FIG. 7B, the new PDCU 304B commands the PFM 420 to modify the appropriate entry in the ART 404 accessible to the PFM 402 to indicate that the SU 102 has been assigned a new LPTID. The PFM 420 then commands the old PDCU 304A to release the LPTID previously assigned.

In the inter-RPCU case shown in FIG. 7C, the new AM 108B of the new RPCU notifies the old AM 108A of the inter-RPCU ALT. The old AM 108A then commands the old PFM 420A to delete the IP entry and the old PDCU 304A to release the LPTID assigned to the previous cell.

FIG. 7D is a diagram showing the SU 102 deregistration process. After a deregistration message (PACKET_REG_REQ) 710 transmitted from the SU 102 is received by the PDCU 304, an authorization request is transmitted from the PDCU 304 to the AM 108. The AM 108 returns the IP address for the SU 102 to the PDCU 304. The PDCU 304 then releases the LPTID and commands the PFM 402 to delete the IP address.

When an SU 102 performs ALT, in addition to the physical channel transfer and the ALT procedure as described above, the PPN 416 must ensure proper routing in the backbone for subsequent IP datagrams destined for the SU 102. During the intra-RPCU ALT, since the SU 102 remains with the same RPCU 106 and in the same IP subnet 418, there is no effect to routing in PPN 416. Inside RPCU 106, the PFM 402 updates the ART 404 and replaces the corresponding entry with a new one that contains the new RP 104 number and the new LPTID. For an inter-RPCU ALT, however, the process is more complicated because not only the ART tables 404 in both the old and new RPCU 106 must be updated, but routing in PPN 416 must also be changed so that subsequent IP datagrams will arrive at the new RPCU 106 instead. This is accomplished in the present invention by incorporating Mobile-IP in the PISA 400.

Mobile-IP is a standard Internet mechanism that allows delivery of IP datagrams to a mobile host without considering the mobile host's current point of attachment to the Internet. To use Mobile-IP, a home agent (HA) and a forwarding agent (FA) is implemented in the IP routing module 532 associated with RPCU 106, and Mobile-IP client software is run at the mobile PC. Preferably, a COTS IP router 538, which has built in Mobile IP, can be substituted for the IP routing module 532.

The present invention also includes a mechanism to improve the airlink efficiency when using Mobile-IP in PACS. Normally, Mobile-IP client software relies on "agent advertisement"—a periodic broadcast message by each FA—to detect the change of IP subnet 418 during hand-off.

Figure 8A:
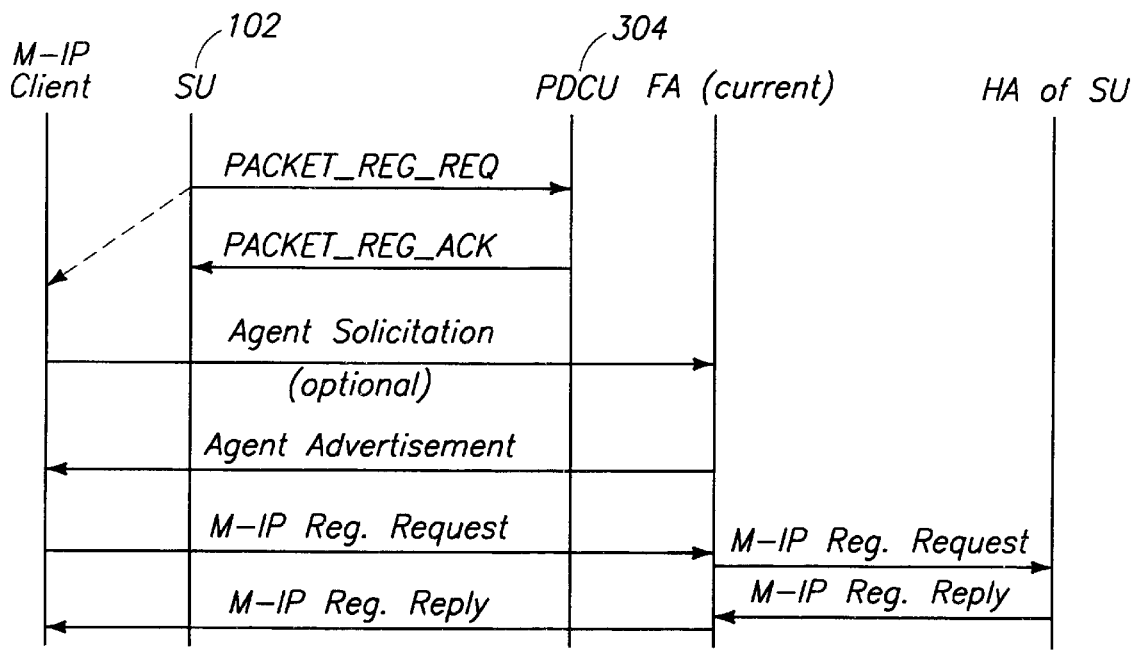
FIG. 8A is a diagram showing message exchanges during normal Mobile-IP registration.

FIG. 8A shows message exchanges during normal Mobile-IP registration. Using the same mechanism in PACS has two problems. First, advertisement messages waste precious airlink bandwidth when there is no hand-off or registration activities. Second, it forces the SU 102 to wait until the next advertisement message arrives, yielding unnecessary long registration time or hand-off latency. To remedy this, and at the same time to preserve the Mobile-IP standard, the PISA 400 includes a Mobile-IP Assist Agent (MIAA) 512 in RPCU 106.

Figure 8B:
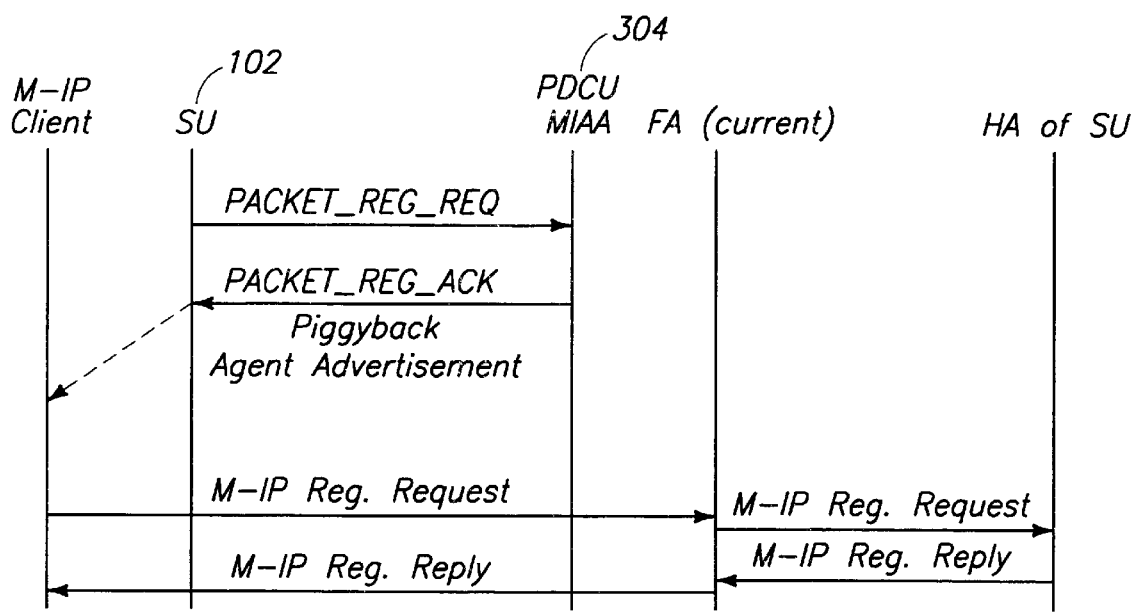
FIG. 8B is a diagram showing the Mobile-IP registration in the PISA.

FIG. 8B shows message exchanged during Mobile_IP registration in the PISA 400. After the RPCU 106 completes inter-RPCU ALT or a fresh registration procedure, MIAA 512 immediately sends an agent advertisement message to the new SU 102 (on-demand advertisement). The PDCU 304 may piggyback this message on the registration reply message (PACKET_REG_ACK). This "piggyback" is an extension to the PACS standard, in which only the PACKET_REG_REQ messages can piggyback network-layer packets.

The result is a saving of one round-trip between SU 102 and RPCU 106. Further, since every Mobile-IP hand-off activity in PACS is preceded by PACS registration or inter-RPCU ALT, the periodic agent advertisement becomes unnecessary. Hence, the periodic Mobile-IP agent advertisement at each FA can be safely disabled.

Multicasting

Access networks must also support one-to-many or many-to-many group communications, known as multicasting. In IP multicast, each group has a globally unique Internet address, referred as IP multicast address, and to reach all group members, multicast datagrams are sent to the IP multicast address instead of to the individual host addresses.

A traditional subnet-wide link-level grouping/addressing scheme is not applicable to a PACS architecture because multicast or broadcast is limited to each cell only (which would not permit the SU 102 to move between cells), and because the PACS architecture has a very limited range of link-level addresses.

To address this problem, the present invention defines a cell-wide grouping/addressing scheme in which each cell 112 manages its own groups and addresses independently from other cells 112. The mapping of global multicast addresses to local group addresses is performed by dynamic mapping of the global multicast address to a vector of group addresses, each corresponding to a cell in the IP subnet 418. This implements a selective multicast capability in which the RPCU 106 only forwards packets to cells that have members, not to all cells 112 indiscriminately. This provides the capability for each PACS user to join any multicast group in the Internet and receive multicast traffic from any source.

IP multicast support in the PISA 400 includes multicast routing in the PPN 416 and local multicast forwarding within each RPCU subnet 418. Multicast routing in PPN 416 is achieved efficiently by adopting the multicast routing protocols used in the Internet/MBone. MBone is a collection of sites on the Internet that support the IP multicast protocol and allow for live audio and video teleconferencing and the like. Local multicast forwarding requires additional functions in RPCU 106 as described below.

A fundamental requirement for PACS multicast is a link-level multicast addressing scheme. The traditional subnet-wide link-layer addressing scheme (e.g. Ethernet) is not applicable in PACS because PACS has a limited link-layer address space (LPTID) compared to the class D IP addresses, and because a PACS subnet 418 is partitioned into many cells 112, each managing LPTIDs independently. When multicast packets reach an RPCU 106 which services group members, a PACS-specific multicast mechanism must deliver them only to the members interested in the multicast group. This requires the ability for local mobile hosts to join cell-wide multicast groups and receive using the cell-wide group addresses assigned to the cell-wide groups.

The PISA 400 satisfies these requirements with a cell-wide scheme in which each cell manages cell-specific groups independently. The link-layer address (LPTID) for an IP multicast group are a PACS "group" address with respect to each cell 112 of the subnet 418. Furthermore, multicast in PACS must be selective in the sense that RPCU 106 only forwards one copy to each cell that has members, not to all cells indiscriminately.

Different methods can be employed in each cell 112 to deliver multicast over the air interface. One approach is a "multi-unicast" where packets are duplicated and delivered as separate messages to each individual SU 102 that is a member of the group. Another is a "PACS broadcast" where multicast data is carried in the broadcast slots (with LPTID) to every SU 102 in the cells, and each SU 102 must process them and filter out packets from uninterested groups. Unfortunately, although the multi-unicast approach is a simple approach, it is typically the most inefficient, since multicast denigrates to multiple unicasts. This negates the advantage of multicast, and wastes precious airlink resources. The broadcast approach wastes central processing unit (CPU) and battery power of SUs 102 that are not members of the particular group. Since the power consumption of the SU 102 is a great concern, this alternative is not attractive.

To address the need for multicast communications without the disadvantages described above, the present invention uses an extended PPC (PACS Packet Channel to allow multicast capability in airlink slot allocation. Normally, each downlink slot (except for control messages) is associated with an LPTID specifying the unique target SU 102. The PISA 400 modifies the PPC so that certain airlink slots can be marked for a multicast group, and enhances the SU 102 with the capability to receive not only those slots that are assigned to the SU 102, but also other slots that are marked for certain groups. This way, all members of the group and only the member can scan process the slots and receive multicast data without the need for duplication or using broadcast.

To accomplish this, the PISA 400 extends the notion of LPTID to include PACS cell-wide multicast groups. This addressing scheme uses a local multicast identifier such as a "multicast" LPTID, (m-LPTID), if it is assigned to a PACS multicast group instead of a particular SU 102. When RPCU 106 delivers a multicast datagram over the air, it uses the corresponding m-LPTID in the downlink. SU 102 can set its receive interface (or PLF 504) with a list of LPTIDs ... the unique LPTID that is assigned when SU enters a cell and registers, and optionally one or more m-LPTIDs. The m-LPTID allocation is dynamic, because the m-LPTID shares the same address space with the normal or unicast LPTIDs. The allocation is different from (unicast) LPTID in two ways. First, an m-LPTID is shared by many SUs 102 in the same group, so it is only allocated when the first group member in a cell requests to join the group. Subsequent requests from other SUs 102 are assigned the same m-LPTID. Likewise, an m-LPTID will be released only after all members leave the group in this cell 112. Second, an m-LPTID can be re-used for more than one multicast group at the same time. This is because the number of available m-LPTIDs is generally much smaller than all the possible IP multicast addresses. Each cell can have at most 238 LPTIDs for both unicast and multicast, but the class D IP multicast address space contains a total of $2^{28}$ addresses. While it is unlikely to have more than dozens active PACS users in a PACS micro-cell, each user can join as many multicast groups as desire. This forces PPC to deal with more than 238 different multicast groups in each cell. In these circumstances, it may be that m-LPTIDs must be reused, and several multicast addresses may be mapped to one m-LPTID. If this is the case, SU 102 will reconstruct the datagram received over this m-LPTID, and discard the datagram if it does not belong to a group that SU 102 subscribes.

The mapping of an IP multicast address to one or more PACS cell-wide group addresses, one per cell, is stored in a PFM's 402 multicast address mapping table (MAMT) 514 which is accessed and managed by the PFM 402. Multicast entries can alternatively be stored along with unicast address mapping information in the ART 404. A MAMT 514 entry now contains a list of (global multicast address G, RP cell number, m-LPTID, M__List). Each multicast entry means that the IP multicast address G has a corresponding PACS group with the m-LPTID assigned to it in the cell 112 RP 104. M__List contains the network layer addresses (such as the IP addresses) of all the members in this group. The presence of an entry with cell number I, with m-LPTID=A and a global address G means that there is at least one SU 102 in a cell I that subscribes to the global multicast G and the cell-wide group address for G is A.

When a multicast packet with address G is received by the PFM 402 from the PPN 416 and the IP router 410, the PFM 402 searches the MAMT 514 for entries with G. This provides cell identifiers for all the RPs 104 which have members which subscribed to group G and the corresponding m-LPTIDs. If a single entry is found, the PFM 402 forwards the packet to the corresponding cell 112 and PDCU 304 with the m-LPTID found from the entry. If multiple entries are found (which indicates that there is more than one cell having members of G) the PFM 402 replicates the received packet and forwards one copy to each cell 122 via the PDCU 304 associated with the cell 122 found from the mapping in the MAMT 514. If no entry is found, the PFM 402 simply drops the packet. This forwarding procedure applies both when the packet comes from the network backbone (a SU-addressed packet), and when the packet comes from an SU (an SU-sourced packet). When an SU 102 transmits a multicast SU-sourced packet, the RP 104 receives it, and forwards the packet via the PDCU 304 to the PFM 402. The PFM 402 then duplicates the packet if necessary, and forwards it according to the MAMT 514 to all cells 112 that have members, including the cell 112 where the packet originated.

Figure 9A:
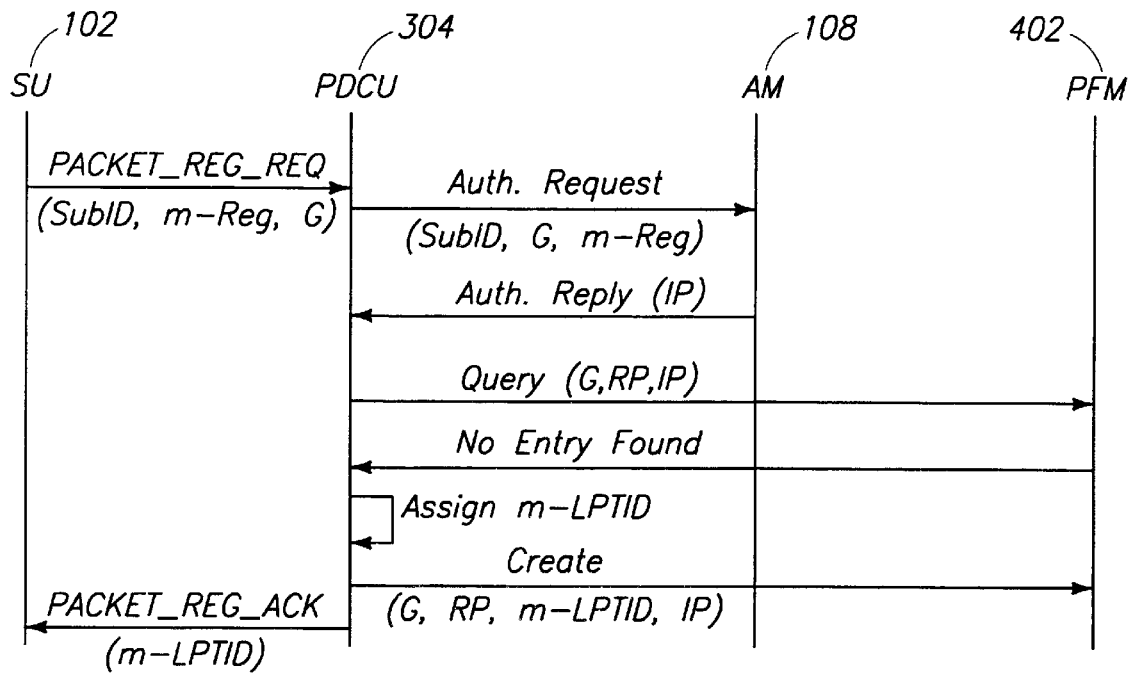
FIGS. 9A and 9B are diagrams showing multicast registration in the PISA.
Figure 9B:
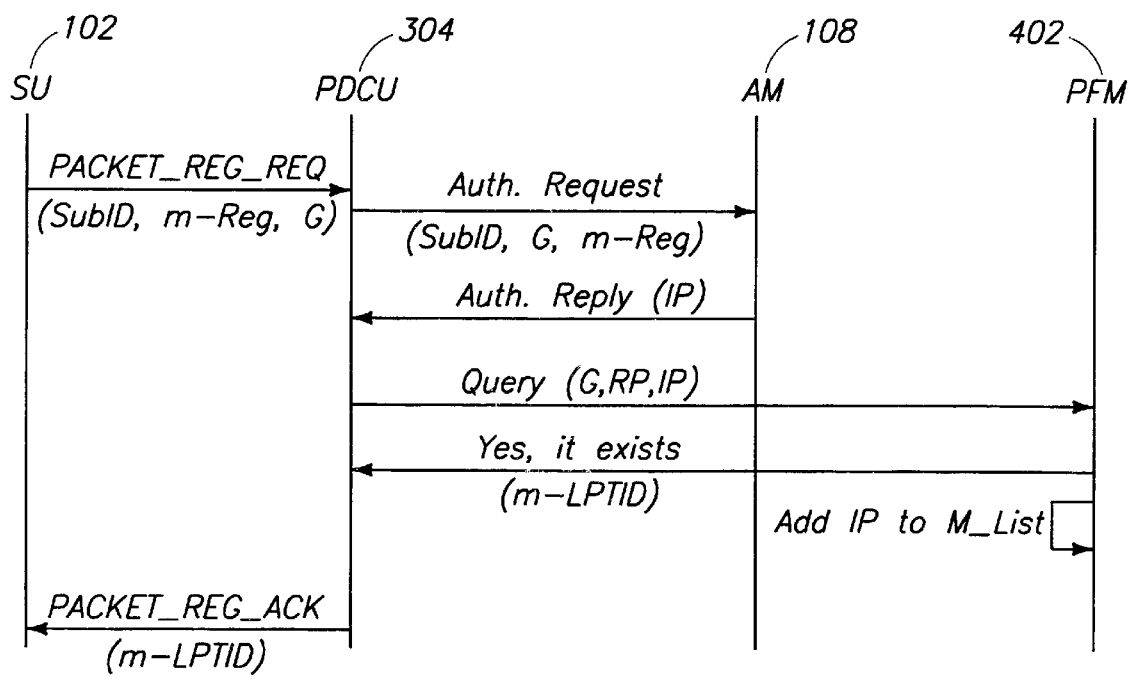

FIGS. 9A and 9B are diagrams showing the multicast registration procedure. Here, the PACS standard is amended with a new type of PACS registration message (PACKET_REG_REQ) called "multicast registration." When a mobile PC requests to join an IP multicast group G, either for the first time or because of an ALT operation, the SU first examines the SU MAMT 516 to assure that no entry with the IP multicast group G exists. If none exists, the SU 102 generates and transmits a registration request message (PACKET_REG_REQ) which includes the requested IP multicast address G and a terminal identifier for the SU 102.

The PDCU 304 then interacts with the AM 108 to authenticate the request and authorize multicast service. Once authenticated, the AM 108 replies with a reply having a subscriber unit internet protocol (IP) address. The PDCU 304 then queries a group verification module 522 in the PFM 402 for G to determine if the requested group G already exists in the SU's 102 cell 112. This is because the requested group G may be a new group in this cell, or the requested group G may have been already joined by another member, and different registration operations are required in each of these cases.

If the requested group does not exist, a new m-LPTID is allocated by the PDCU 304 allocation module 520. Then, the new m-LPTID is sent to the PFM 402, where it is and assigned to the new multicast group by the assignment module 524, and mapped to the IP multicast address G by an allocation module 520. A corresponding entry of the foregoing information is then stored in the MAMT 514. As described herein, there are a limited number of LPTIDs available for selection at each cell 112. The assigned m-LPTID can be selected from a group of LPTIDs that are reserved for multicast use. Alternatively, the m-LPTID can be selected from the available LPTIDs on a first come-first serve basis. LPTIDs can also be re-used (shared between groups), but this requires that the SUs 102 filter out unwanted messages.

If the requested group currently exists, G already has a m-LPTID assigned, and the corresponding entry exists. In this case, the PFM 402 retrieves the m-LPTID from the ART 404, and adds the SU's 102 IP address to the ART 404. In both cases, the RPCU 106 returns the m-LPTID number to the SU 102 in a (PACKET_REG_ACK) message.

As described above, when an SU 102 becomes a member of a multicast group, it is assigned the m-LPTID for the group that it is interested in. After it has received the m-LPTID for the group, it must add the m-LPTID to a SU Multicast Address Mapping Table (MAMT). 516 in the SU 102. The SU MAMT 516 need not be a duplicate of the MAMT 514 in the RPCU 106, since the SU 102 need only keep track of the groups it has joined.

PACS multicast hand-off involves two processes during ALT. First, after a SU 102 performs ALT, it must re-join all the IP multicast groups it has joined from the previous cell because the PACS multicast is cell-specific. Second, if it is inter-RPCU ALT, the old RPCU 106 updates its MAMT 514 by removing this user from all the groups it has joined.

In order to efficiently use the airlink bandwidth, an explicit multicast de-registration is adopted. Since the current PACS standard defines only a single type of de-registration, a new type of de-registration is created for multicast: "multicast de-registration." A PACS user performs multicast de-registration only if it leaves a multicast group it has joined within the same cell (i.e., not as a result of ALT) but is still attached to the network. If this user is leaving the network permanently, SU 102 performs the regular de-registration, during which RPCU 106 removes the SU 102 from all the groups in the MAMT 514.

When the mobile PC requests to leave an IP multicast group, SU 102 sends a multicast de-registration message to inform RPCU 106. The multicast de-registration message includes the SU's 102 IP address, the group address, and the m-LPTID mapped to this group address. During multicast de-registration, RPCU 106 checks to see if the SU 102 is the only member of the multicast group. This is accomplished by the PFM 402 searching the MAMT 514 for the corresponding m-LPTID and group addresses G. 1f so, RPCU 106 releases the m-LPTID and removes the corresponding tuple from the corresponding entry in the MAMT 514. Otherwise, the PFM 402 removes only the IP address for the SU 102 from the MAMT 514.

The SU 102 is not required to perform de-registration when it moves to a different cell 112. Since the number of m-LPTIDs is limited, this raises the problem of removing the SU 102 from as a group user in the previous cell 112 if it was a member of a multicast group. This is handled by using a PACS mechanism which detects SU 102 inactivity. When an SU 102 has not transmitted a message during a specified period of time (a maximum inactivity interval parameter) to an RP 104 serving a cell 112, the SU 102 generates and transmits a packet with no data (PACKET_NULL). This can be implemented internally by the SU 102, or by a command transmitted from the RP 104. If no data arrives from the SU 102 during the maximum inactivity interval, it is assumed that the SU 102 has gone off-line, or has performed an ALT. In this case, a handoff module in the RPCU 106 instructs the PFM 402 to remove the user from the corresponding entry in the ART 404 (or the MAMT 514).

IP multicast uses a group membership protocol (IGMP) to determine whether there is a member for a particular group in the subnet 418. Internet routers use this information to determine whether or not traffic for a multicast group should be delivered to the subnet 418. In the PISA 400, the IP router 410 sends a periodic IGMP membership query message to the link that connects to the RPCU 106, and expects at least one member to reply with IGMP report messages.

Normally, IGMP query messages are multicast to all multicast-capable hosts in the subnet 418. When one member replies, the reply messages are also multicast to the group to suppress other member's reply (since one reply per group is sufficient). However, using the same scheme in the PISA 400 would cause unnecessary overhead, because the RPCU 106 already keeps the multicast mapping information in its MAMT 514. For each multicast address that has an entry in MAMT 514, there must be at least one member in this RPCU 106 subnet 418. Therefore, RPCU 106 implements an IGMP support module (not shown) to intercept all IGMP queries from the IP router 410, and respond with IGMP reports generated from the MAMT 514. This PISA 400 group membership scheme seamlessly supports the IGMP version 2. When a new multicast group is added to the MAMT 514, the RPCU sends an unsolicit membership report to the IP router 410, and when a multicast group is removed from the MAMT 514, the RPCU 106 sends out an explicit leave message.

Quality of Service Support

Quality of Service (QoS) support in wireless networks is an important, but difficult to achieve. This is due in a major part to the unpredictable nature of wireless link quality. However, different levels of service can be achieved in PACS by employing different fragment schemes, packet scheduling (Class-Based Queue or Weighted Fair Queuing), and ARQ. The goal is to support multiple levels of services and fairness within each service class by implementing several packet drop and delay preferences over the downlink.

The PPC functions honor the type-of-service (TOS) field defined in each IP datagram. The field defines the type of parameter to be optimized when delivering this datagram such as: minimizing delay, maximizing throughput, or maximizing reliability. PDCU 304 sniffs each IP datagram header for the TOS field. Based on the TOS value, PDCU 304 makes proper choices in IP forwarding.

The first choice is downlink fragmentation. While downlink DL packet must be divided into DL fragments, there are several strategies that can be employed to accomplish this. The normal case is that of "minimum fragmentation," in which fragmentation is always at a multiple of 576 bytes (maximum fragment size). Minimum fragmentation produces minimum number of fragments, so it yields maximum throughput because the overhead (fragmentation headers, etc.) is lower. Another strategy is that of "maximum fragmentation." Since each DL fragment can be sent in separate slot, a DL packet may be divided into 8 smaller fragments for parallel delivery. The fragments are smaller, hence, the entire packet can arrive sooner and the delay is minimized.

Figure 10:
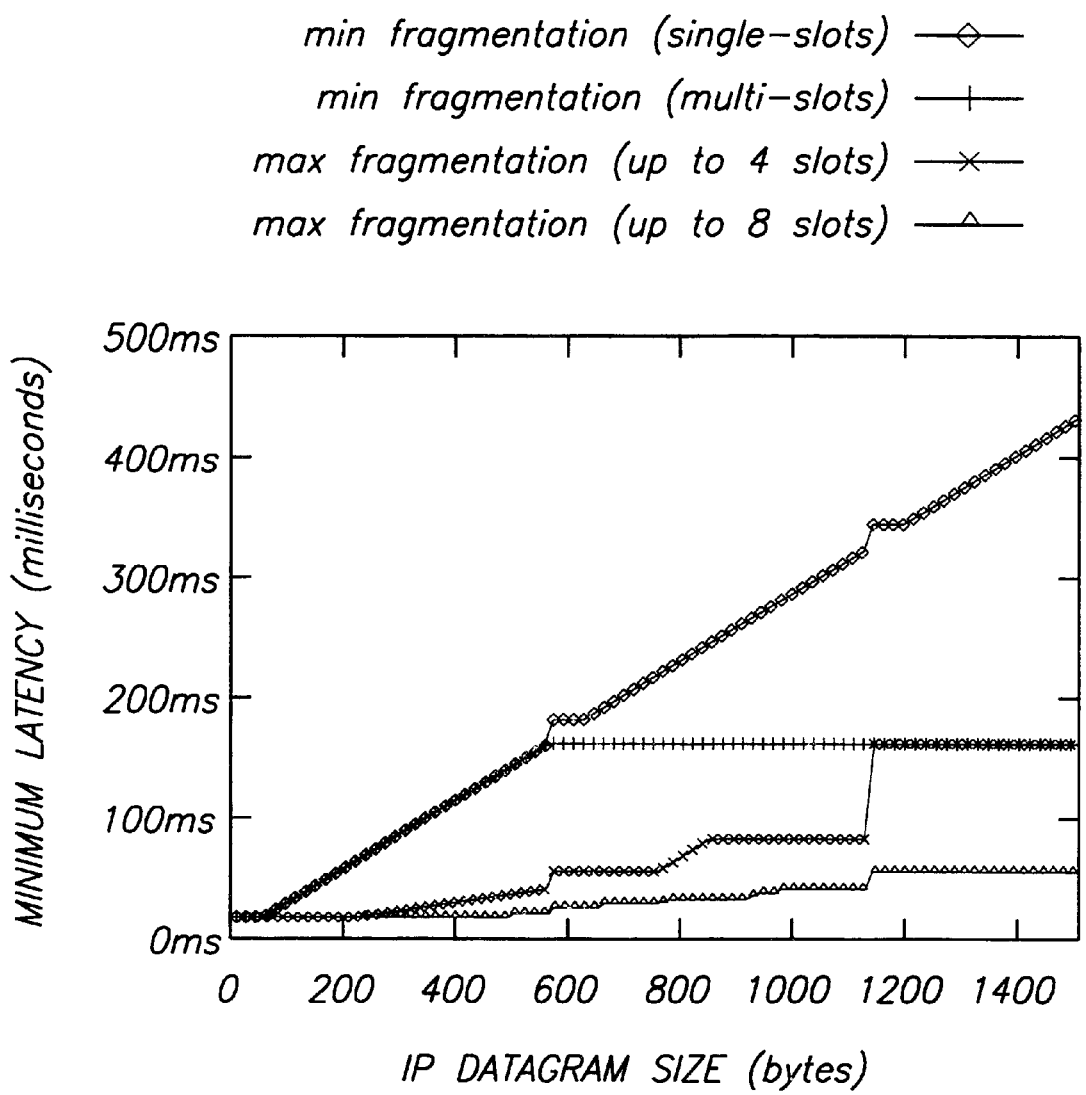
FIGS. 10 and 11 are diagrams illustrating how different fragmentation strategies affect performance.
Figure 11:
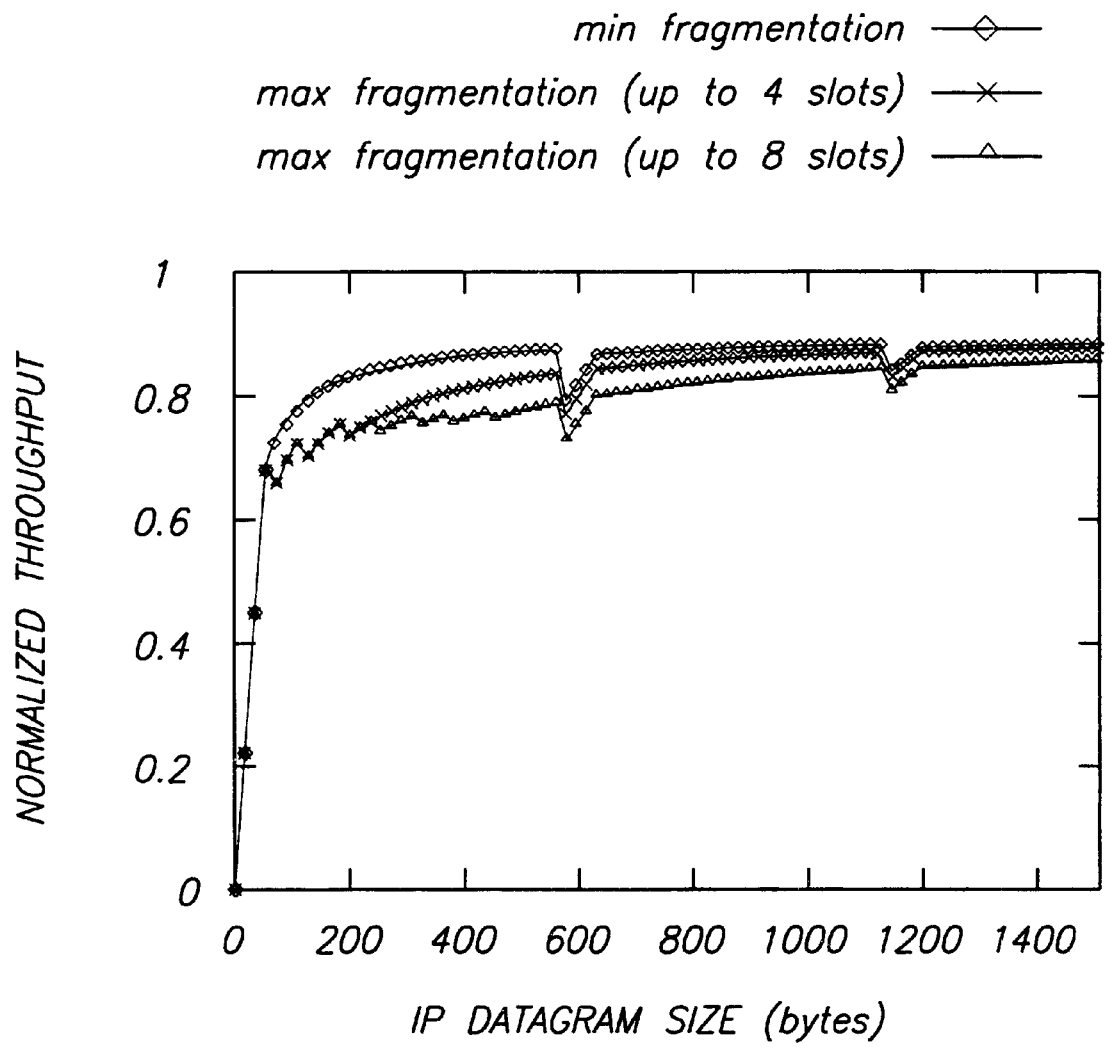

FIGS. 10 and 11 are diagrams illustrating how different fragmentation strategies affect performance. The data is derived through a numerical analysis under ideal conditions: all slots cleared from previous transmission, no error in the airlink, no retransmission, and no medium-access delay. Other PACS protocol overhead is also ignored, such as control messages, system information, acknowledges, MAC, as well as superframe headers.

FIG. 10 shows the airlink propagation delay a function of an IP packet size, which constitutes minimum delay. In the maximum fragmentation case, packets are divided nearly equally (subjected to PACS fragmentation rules) among 2, 4, or 8 slots.

FIG. 11 shows the normalized throughput (the size of the IP datagram divided by the total raw bandwidth) used to deliver the packet. The overhead is framing overhead, which includes the fragment and segment headers, DL and SL checksums, as well as padding to meet the minimum fragment size.

These graphs indicate that the delay can be significantly reduced with less than 10\framing overhead increase. Therefore, it is feasible to achieve different levels of service by manipulating the number of fragments for each service and transmit them over multiple slots in parallel. Nevertheless, the actual delay and packet loss will be affected by the load fluctuation, i.e., some slots may have more segments in queue than others. Therefore, the fragmentation algorithm must consider the queue length so that the queuing delay and packet loss do not affect the end-to-end quality of service.

Another scheme that can be employed to achieve different levels of service over downlink is ARQ. The PACS standard allows PDCU 304 to selectively enable or disable ACK for each DL packet 218. For example, for IP datagrams with low drop priority, PDCU 304 sets the "ACK required" bit in DL packet header 220. With this, the SU 102 will acknowledge all properly received segments, allowing PDCU 304 to retransmit missing or error segments selectively. This scheme is further described below.

The current PACS packet mode service defines two Automatic Repeat reQuest (ARQ) schemes for error recovery at the PACS level. One of these schemes is used for the uplink (from the SU 102 to the RP 104) and the other for the downlink (from the RP 104 to the SU 102). As currently defined, the uplink ARQ is mandatory, and the downlink ARQ is selective on a packet by packet basis.

The PISA 400 modifies this architecture in two ways. First, in the PISA 400, uplink ARQs are not mandatory, but selective on a packet by packet basis. Second, the ARQ is activated for both uplink and downlink for loss sensitive traffic (like web traffic), and turned off for delay-sensitive traffic (such as Internet video and audio). This prevents wireless bandwidth from being wasted by re-transmitting packets not requiring error-free transmission over a PACS airlink, yielding an increase in effective capacity.

In accordance with the foregoing, the PFM 402 comprises a data payload analysis module 526. The data payload analysis module 526 determines if the SU-addressed data payload is a loss-sensitive message or a delay-sensitive message. In one embodiment, this is accomplished by determining if the SU-addressed data payload conforms to a transfer control protocol (TCP) or whether it conforms to a user datagram protocol (UDP).

In the downlink case, when the PFM 402 examines the destination IP address of the data packet, it also determines whether the data payload of the packet conforms to TCP or UDP by looking at the IP packet header. If TCP and a matching entry is found in the ART 404, the PFM-PDCU interface module 528 notifies the corresponding PDCU 304 to set an ACK required bit in the DL header 220 to one (1), indicating that an ARQ is required from the SU 102. If the data packet conforms to UDP, the PFM-PDCU interface module 528 notifies the corresponding PDCU 304 to set the ACK required bit in the DL header 220 to zero (0), indicating that an ARQ is not required.

In the uplink case, a security layer in the higher layers 510 of the SU 102 sets the ACK required bit to a zero (0) or a one (1) depending on whether the packet is TCP or UDP. Upon receiving data packets with the ACK required bit set to zero, the PDCU 304 at the RPCU 106 does not broadcast the transmission status of the packet on the downlink (as would otherwise be required according to the current PACS standard).

Conclusion

This concludes the description of the preferred embodiments of the present invention. In summary, the present invention describes a method and apparatus for multicasting data. The method comprises the steps of allocating a multicast packet terminal identifier to a multicast group when a subscriber unit in a cell requests membership in the multicast group, receiving a multicast packet having a global multicast address, determining a cell identifier from a mapping of the global multicast address to at least one multicast local packet terminal identifier and a cell identifier, and forwarding the multicast packet to the cell according to the cell identifier.

The apparatus comprises a radio port controller unit having a packet data control unit coupled to a radio port configured to receive a multicast packet and a packet forwarding module. The packet data control unit includes an allocation module configured to allocate a multicast local packet terminal identifier-to a multicast group when a subscriber unit in a cell requests membership in the multicast group. The packet forwarding module is configured to determine a cell identifier from a mapping of a global multicast address for the multicast packet to at least one multicast local packet terminal identifier and a cell identifier. The packet forwarding module also forwards the multicast packet to a cell according to the cell identifier.

The foregoing description of the preferred embodiment of the invention has been presented for the purposes of illustration and description. It is not intended to be exhaustive or to limit the invention to the precise form disclosed. Many modifications and variations are possible in light of the above teaching.

For example, although the foregoing description focused primarily on a TDMA multicell network for exemplary purposes, the principles of the present invention can also be applied to code division multiple access (CDMA) and GSM (Global system for Mobile Communications) systems, as well as the future $3^{rd}$ generation Mobile wireless network.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of multicasting data, comprising the steps of:
   allocating a local multicast identifier to a multicast group when a subscriber unit in a cell requests membership in the multicast group;
   receiving a multicast packet having a global multicast address;
   determining a cell identifier from a mapping of the global multicast address to at least one local multicast identifier and a cell identifier; and
   forwarding the multicast packet to a cell according to the cell identifier.

2. The method of claim 1, wherein the global multicast address, the multicast local packet identifier, the cell identifier and a subscriber unit internet protocol (IP) address associated with the subscriber unit are stored in a table, and the method step of determining the cell identifier from the mapping of the global multicast address to at least one local multicast identifier and a cell identifier comprises the step of searching the table for multicast local packet identifier, and the cell identifier associated with the global multicast address.

3. The method of claim 1, wherein the step of allocating a local multicast identifier to a multicast group when a subscriber unit requests membership in a multicast group comprises the steps of:
   receiving a registration request from the subscriber unit associated with a subscriber unit internet protocol (IP) address;
   determining if the multicast group exists;
   assigning a local multicast identifier to the multicast group and storing a mapping between the global multicast address, the cell identifier, the local multicast identifier, and the subscriber unit IP address if the multicast group does not exist;
   retrieving the local multicast identifier for the multicast group and adding the subscriber unit IP address to the mapping if the multicast group does exist; and
   transmitting the local multicast identifier to the subscriber unit.

4. The method of claim 3, wherein the registration request includes a global multicast address, and a terminal ID uniquely identifying the subscriber unit, and the method further comprises the step of authenticating the registration request and responding with the subscriber unit IP address.

5. The method of claim 3, wherein the step of allocating a local multicast identifier to a multicast group when a subscriber unit requests membership in a multicast group further comprises the step of storing the local multicast identifier in the subscriber unit.

6. The method of claim 1, wherein the step of allocating the local multicast identifier comprises the step of selecting the local multicast identifier from a group of reserved local packet terminal identifiers.

7. The method of claim 1, wherein the step of allocating the local multicast identifier comprises the step of selecting the local multicast identifier from a group of local packet terminal identifiers.

8. The method of claim 1, wherein a local multicast identifier allocated to a second multicast group is allocated to the multicast group if all available local multicast identifiers are currently allocated.

9. The method of claim 1, further comprising the steps of:
   intercepting a membership query from an internet router; and
   replying to the membership query based on the mapping.

10. The method of claim 1, further comprising the steps of:
    accepting a de-registration message from the subscriber unit;
    determining if the subscriber unit is an only member of the multicast group;
    deleting the subscriber unit from the multicast group if the subscriber unit is not the only member of the multicast group; and
    deleting the multicast group if the subscriber unit is the only member of the multicast group.

11. The method of claim 10, wherein the global multicast address, the local multicast identifier, the cell identifier and the subscriber unit IP address is stored as a row in a table, and wherein:
    the step of deleting the subscriber unit from the multicast group if the subscriber unit is not the only member of the multicast group comprises the step of deleting the subscriber unit IP address from the table; and
    the step of deleting the multicast group if the subscriber unit is the only member of the multicast group comprises the step of deleting the multicast group and all associated entries from the table.

12. The method of claim 1, further comprising the step of:
determining if the subscriber unit has transmitted a message to the cell within a time period; and
deleting the subscriber unit from the mapping if the subscriber unit has not transmitted a message to the cell within a time period.

13. An apparatus for multicasting data, comprising:
means for allocating a local multicast identifier to a multicast group when a subscriber unit in a cell requests membership in the multicast group;
means for receiving a multicast packet having a global multicast address; and
means for determining a cell identifier from a mapping of the global multicast address to at least one local multicast identifier and a cell identifier; and
means for forwarding the multicast packet to a cell according to the cell identifier.

14. The apparatus of claim 13, wherein the means for allocating a local multicast identifier to a multicast group when a subscriber unit in a cell requests membership in the multicast group comprises:
means for receiving a registration request from the subscriber unit associated with a subscriber unit internet protocol (IP) address;
means for determining if the multicast group exists;
means for assigning a local multicast identifier to the multicast group and storing a mapping between the global multicast address, the cell identifier, the local multicast identifier, and the subscriber unit IP address if the multicast group does not exist;
means for retrieving the local multicast identifier for the multicast group and adding the subscriber unit IP address to the mapping if the multicast group does exist; and
means for transmitting the local multicast identifier to the subscriber unit.

15. The apparatus of claim 13, further comprising:
means for intercepting a membership query from an internet router; and
means for replying to the membership query based on the mapping.

16. The apparatus of claim 13, further comprising:
means for accepting a de-registration message from the subscriber unit;
means for determining if the subscriber unit is an only member of the multicast group;
means for deleting the subscriber unit from the multicast group if the subscriber unit is not the only member of the multicast group; and
means for deleting the multicast group if the subscriber unit is the only member of the multicast group.

17. The apparatus of claim 13, further comprising:
means for determining if the subscriber unit has transmitted a message to the cell within a time period; and
means for deleting the subscriber unit from the mapping if the subscriber unit has not transmitted a message to the cell within a time period.

18. A radio port controller unit for multicasting data, comprising:
a packet data control unit coupled to a radio port configured to receive a multicast packet, the packet-data control unit having an allocation module configured to allocate a local multicast identifier to a multicast group when a subscriber unit in a cell requests membership in the multicast group; and
a packet forwarding module, coupled to the packet data control unit, the packet forwarding module configured to determine a cell identifier from a mapping of a global multicast address for the multicast packet to at least one local multicast identifier and a cell identifier and to forward the multicast packet to a cell according to the cell identifier.

19. The apparatus of claim 18, wherein the global multicast address, the local multicast identifier, and the cell identifier are stored in a table.

20. The apparatus of claim 19, wherein the radio port further comprises a registration module configured to receive a registration request from the subscriber unit having a subscriber unit internet protocol (IP) address.

21. The apparatus of claim 20, wherein the packet forwarding module further comprises:
a group verification module configured to query the table to determine if the multicast group exists; and
an assignment module configured to assign the local multicast identifier to the multicast group, to store the mapping between the global multicast address, the cell identifier, and the local multicast identifier, and the subscriber unit IP address if the multicast group does not exist and to receive the multicast local packet terminal if the multicast group exists.

22. The apparatus of claim 18, wherein the radio port controller unit further comprises an internet group membership protocol service module, configured to intercept a membership query from an internet router and to reply to the membership query according to the mapping.

23. The apparatus of claim 18, wherein:
the radio port is further configured to receive a de-registration message from the subscriber unit; and
the radio port controller unit further comprises a de-registration module configured accept the de-registration message, to delete the subscriber unit from the multicast group if the subscriber is not the only member of a multicast group, and to delete the multicast group if the subscriber unit is the only member of the multicast group.

24. The apparatus of claim 18, wherein the radio port controller unit further comprises a handoff module configured to delete the subscriber unit IP address if the subscriber unit has not transmitted a message to the cell within a time period.

25. A method of multicasting data, comprising the steps of:
determining a cell identifier from a mapping of a global multicast address of a received multicast packet to at least one local multicast identifier allocated to a multicast group and a cell identifier; and
forwarding the multicast packet to a cell according to the cell identifier.

26. The method of claim 25, wherein:
the method further comprises the step of receiving the multicast packet, and
wherein the multipath packet comprises a global multicast address.

27. The method of claim 26, further comprising the step of:
allocating the multicast terminal identifier to the multicast group.

28. A method for forwarding a multicast packet to at least one cell of a plurality of cells, comprising:
determining the at least one desired cell from a mapping of a global multicast address to at least one multicast local paket terminal identifier and a cell identifier; and forwarding the multicast packet to the at least one desired cell according to the cell identifier.

29. The method of claim 28, wherein each one of the plurality of cells manages groups and addresses associated therewith independently from other cells of the plurality of cells.

30. The method of claim 29, wherein the mapping of the global multicast address is performed by dynamically mapping the global multicast address to a vector of group addresses each corresponding to one cell of the plurality of cells.

31. An apparatus for forwarding multicast data packets to a desired cell, comprising:
   a multicast data packet forwarding module configured to determine a cell from a mapping of a global multicast address for the multicast packet to at least one local multicast identifier and a cell identifier and to forward the multicast packet to the desired cell according to the cell identifier.

32. The apparatus of claim 31, wherein the global multicast address, the local multicast identifier, and the cell identifier are stored in a table.

33. A radio port controller unit for multicasting data, comprising:
   a packet data control unit coupled to a radio port configured to receive a multicast packet, the packet data control unit having an allocation module configured to allocate a local multicast identifier to a multicast group; and
   a packet forwarding module, coupled to the packet data control unit, the packet forwarding module configured to determine a cell identifier from a mapping of a global multicast address for the multicast packet to at least one local multicast identifier and a cell identifier and to forward the multicast packet to a cell according to the cell identifier.

34. A radio port controller unit for multicasting data, comprising:
   a packet data control unit coupled to a radio port configured to receive a multicast packet, the packet data control unit having an allocation module configured to allocate a local multicast identifier to a multicast group; and
   a packet forwarding module, coupled to the packet data control unit, the packet forwarding module configured to identify a cell from a mapping of a global multicast address for the multicast packet to at least one identified local multicast and the indentified cell and to forward the multicast packet to the indentified cell.

* * * * *